US008660921B2

(12) United States Patent
Bean et al.

(10) Patent No.: US 8,660,921 B2

(45) Date of Patent: Feb. 25, 2014

(54) SYSTEM FOR CATEGORIZING INVENTORY AND SECURING PURCHASE AND SALE

(75) Inventors: Scott Joseph Bean, Seattle, WA (US); Steven John Malloy, Redmond, WA (US); Steven Allen Hull, Snoqualmie, WA (US); Robert Scoverski, Seattle, WA (US); Cameron Daniel Knudson, Seattle, WA (US); Kurtis Reed Bray, Mercer Island, WA (US)

(73) Assignee: Silvaris Corporation, Seattle, WA (US)

( * ) Notice: Subject to any disclaimer, the term of this patent is extended or adjusted under 35 U.S.C. 154(b) by 668 days.

(21) Appl. No.: 11/329,414

(22) Filed: Jan. 9, 2006

(65) Prior Publication Data

US 2006/0253393 A1 Nov. 9, 2006

Related U.S. Application Data

(60) Provisional application No. 60/642,127, filed on Jan. 7, 2005, provisional application No. 60/644,327, filed on Jan. 13, 2005, provisional application No. 60/690,407, filed on Jun. 13, 2005.

(51) Int. Cl.
*G04Q 40/00* (2012.01)

(52) U.S. Cl.
USPC .......... 705/35

(58) Field of Classification Search
USPC .......... 705/35
See application file for complete search history.

(56) References Cited

U.S. PATENT DOCUMENTS

| | | | | |
|---|---|---|---|---|
| 6,934,692 | B1 * | 8/2005 | Duncan | 705/35 |
| 7,324,966 | B2 * | 1/2008 | Scheer | 705/28 |
| 7,363,249 | B1 * | 4/2008 | Boesjes | 705/26 |
| 2002/0007318 | A1 | 1/2002 | Alnwick | |
| 2003/0204450 | A1 | 10/2003 | Heinrichs et al. | |
| 2004/0039629 | A1 * | 2/2004 | Hoffman et al. | 705/10 |
| 2004/0254853 | A1 * | 12/2004 | Heene et al. | 705/26 |
| 2005/0075941 | A1 * | 4/2005 | Jetter et al. | 705/26 |
| 2005/0197926 | A1 * | 9/2005 | Chinnappan et al. | 705/27 |
| 2005/0256798 | A1 * | 11/2005 | Herter et al. | 705/37 |
| 2006/0122892 | A1 * | 6/2006 | Fletcher et al. | 705/26 |

OTHER PUBLICATIONS

StockGate: Are Federal Regulators, Hedrge Funds About to Get Spitzered? FinancialWire [Forest Hills] Dec. 16, 2005:1.*

Globalization and the Renewal of Asian Business Networks; Carney, Michael. Asia Pacific Journal of Management 22.4 (Dec. 2005): 337-354.*

Creating a Win-Win in the Telecommunications Industry: The Relationship between MVNOs and MNOs in Taiwan; Yang, Chyan; Guey Lan Fu; Gwo Hshiung Tzeng. Canadian Journal of Adminstrative Sciences 22. 4 (Dec. 2005): 316-328.*

* cited by examiner

*Primary Examiner* — Hani M Kazimi
*Assistant Examiner* — Hatem M Ali
(74) *Attorney, Agent, or Firm* — Patrick M Dwyer

(57) ABSTRACT

A method implemented by a first party to facilitate a sale by a second party of at least a subset of a set of items includes contractually committing, at a first time, to the second party to purchase title in the item subset, generating a displayable user interface accessible over a network to the second party, the user interface operable to allow the second party to input information describing the items, receiving the information over the network, and issuing via the network, at a second time of the first party's choosing and subsequent to the first time, a purchase order to the second party for the item subset. Alternatively, the purchase order may be issued by the second party at a second time of the second party's choosing and subsequent to the first time.

24 Claims, 41 Drawing Sheets

12A6

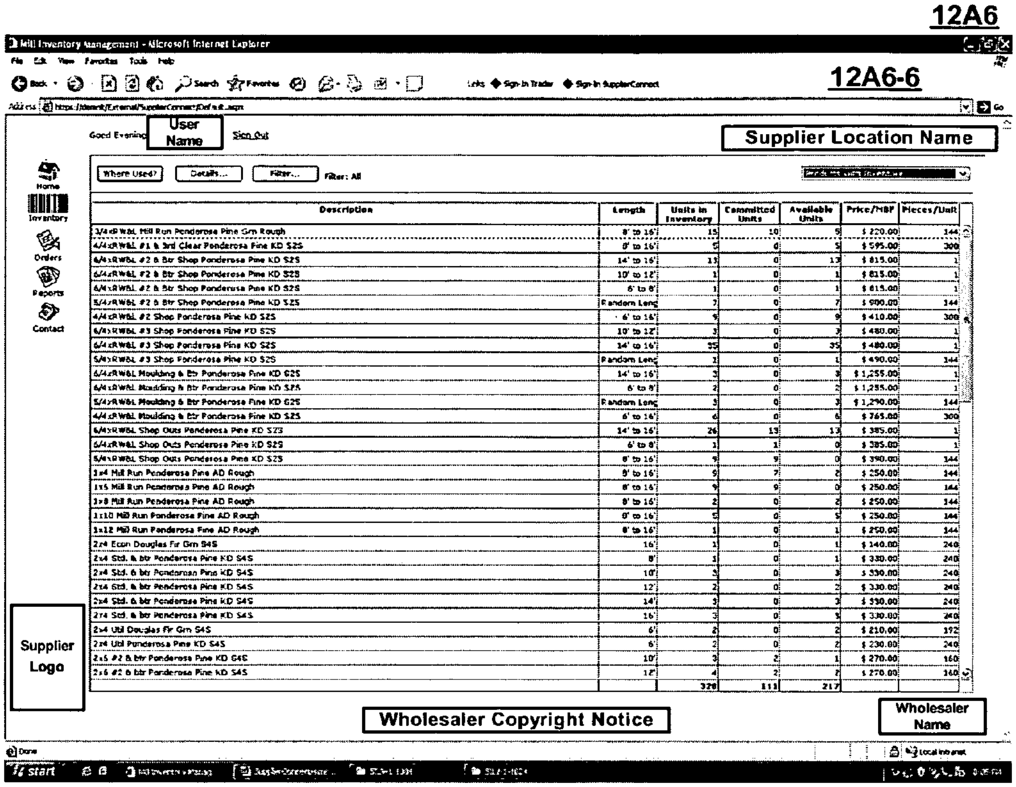

| Description | Length | Units in Inventory | Committed Units | Available Units | Price/MBF | Pieces/Unit |
|---|---|---|---|---|---|---|
| 3/4xRW&L Mill Run Ponderosa Pine Grn Rough | 8' to 16' | 15 | 10 | 5 | $ 220.00 | 144 |
| 4/4xRW&L #1 & 3rd Clear Ponderosa Pine KD S2S | 8' to 16' | 5 | 0 | 5 | $ 595.00 | 300 |
| 6/4xRW&L #2 & Btr Shop Ponderosa Pine KD S2S | 14' to 16' | 13 | 0 | 13 | $ 815.00 | 1 |
| 6/4xRW&L #2 & Btr Shop Ponderosa Pine KD S2S | 10' to 12' | 1 | 0 | 1 | $ 815.00 | 1 |
| 6/4xRW&L #2 & Btr Shop Ponderosa Pine KD S2S | 6' to 8' | 1 | 0 | 1 | $ 815.00 | 1 |
| 5/4xRW&L #2 & Btr Shop Ponderosa Pine KD S2S | Random Leng | 7 | 0 | 7 | $ 900.00 | 144 |
| 4/4xRW&L #2 Shop Ponderosa Pine KD S2S | 6' to 16' | 9 | 0 | 9 | $ 410.00 | 300 |
| 6/4xRW&L #3 Shop Ponderosa Pine KD S2S | 10' to 12' | 3 | 0 | 3 | $ 480.00 | 1 |
| 6/4xRW&L #3 Shop Ponderosa Pine KD S2S | 14' to 16' | 35 | 0 | 35 | $ 480.00 | 1 |
| 5/4xRW&L #3 Shop Ponderosa Pine KD S2S | Random Leng | 1 | 0 | 1 | $ 490.00 | 144 |
| 6/4xRW&L Moulding & Btr Ponderosa Pine KD G2S | 14' to 16' | 3 | 0 | 3 | $ 1,255.00 | 1 |
| 6/4xRW&L Moulding & Btr Ponderosa Pine KD S2S | 6' to 8' | 2 | 0 | 2 | $ 1,255.00 | 1 |
| 5/4xRW&L Moulding & Btr Ponderosa Pine KD G2S | Random Leng | 3 | 0 | 3 | $ 1,290.00 | 144 |
| 4/4xRW&L Moulding & Btr Ponderosa Pine KD S2S | 6' to 16' | 6 | 0 | 6 | $ 765.00 | 300 |
| 6/4xRW&L Shop Outs Ponderosa Pine KD S2S | 14' to 16' | 26 | 13 | 13 | $ 385.00 | 1 |
| 6/4xRW&L Shop Outs Ponderosa Pine KD S2S | 6' to 8' | 1 | 1 | 0 | $ 385.00 | 1 |
| 5/4xRW&L Shop Outs Ponderosa Pine KD S2S | 8' to 16' | 9 | 9 | 0 | $ 390.00 | 144 |
| 1x4 Mill Run Ponderosa Pine AD Rough | 9' to 16' | 9 | 7 | 2 | $ 250.00 | 144 |
| 1x5 Mill Run Ponderosa Pine AD Rough | 8' to 16' | 9 | 9 | 0 | $ 250.00 | 144 |
| 1x8 Mill Run Ponderosa Pine AD Rough | 8' to 16' | 2 | 0 | 2 | $ 250.00 | 144 |
| 1x10 Mill Run Ponderosa Pine AD Rough | 8' to 16' | 5 | 0 | 5 | $ 250.00 | 144 |
| 1x12 Mill Run Ponderosa Pine AD Rough | 8' to 16' | 1 | 0 | 1 | $ 250.00 | 144 |
| 2x4 Econ Douglas Fir Grn S4S | 16' | 1 | 0 | 1 | $ 140.00 | 240 |
| 2x4 Std. & btr Ponderosa Pine KD S4S | 8' | 1 | 0 | 1 | $ 330.00 | 240 |
| 2x4 Std. & btr Ponderosa Pine KD S4S | 10' | 3 | 0 | 3 | $ 330.00 | 240 |
| 2x4 Std. & btr Ponderosa Pine KD S4S | 12' | 2 | 0 | 2 | $ 330.00 | 240 |
| 2x4 Std. & btr Ponderosa Pine KD S4S | 14' | 3 | 0 | 3 | $ 330.00 | 240 |
| 2x4 Std. & btr Ponderosa Pine KD S4S | 16' | 3 | 0 | 3 | $ 330.00 | 240 |
| 2x4 Util Douglas Fir Grn S4S | 6' | 2 | 0 | 2 | $ 210.00 | 192 |
| 2x4 Util Ponderosa Pine KD S4S | 6' | 2 | 0 | 2 | $ 230.00 | 240 |
| 2x5 #2 & btr Ponderosa Pine KD S4S | 10' | 3 | 2 | 1 | $ 270.00 | 160 |
| 2x6 #2 & btr Ponderosa Pine KD S4S | 12' | 4 | 2 | 2 | $ 270.00 | 160 |
| | | 328 | 111 | 217 | | |

Mill Product Where Used Report

Supplier Location Name

3/4xRW&L Mill Run Ponderosa Pine Grn Rough 8' to 16'

Date: 12/22/2005

Committed Inventory

| Tracking # | Qty (bf) | Units |
|---|---|---|
| 456402 | 13,980 | 10 |

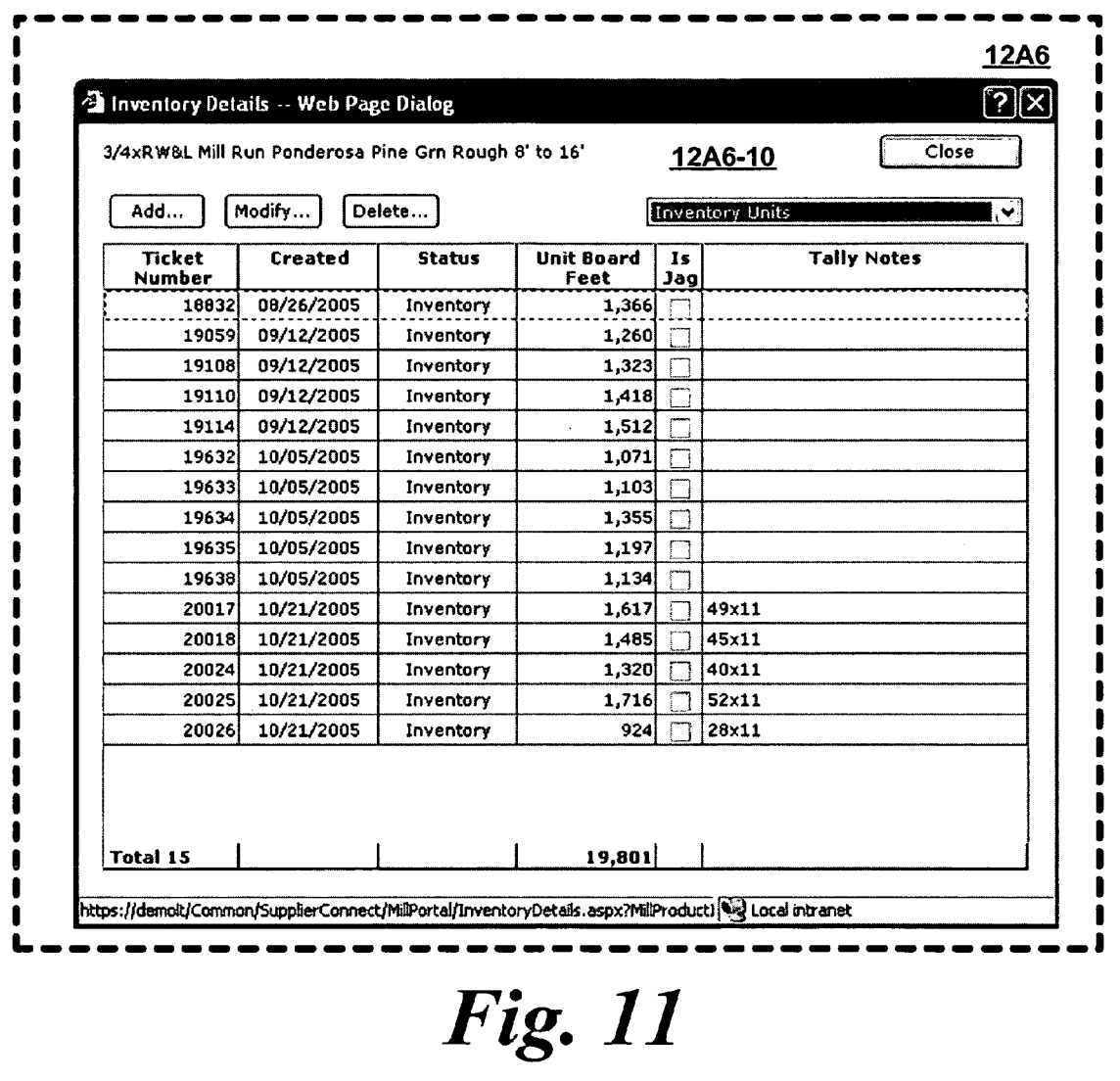

Inventory Details -- Web Page Dialog

3/4xRW&L Mill Run Ponderosa Pine Grn Rough 8' to 16' 12A6-10 Close

Add... Modify... Delete... Inventory Units

| Ticket Number | Created | Status | Unit Board Feet | Is Jag | Tally Notes |
|---|---|---|---|---|---|
| 18832 | 08/26/2005 | Inventory | 1,366 | ☐ | |
| 19059 | 09/12/2005 | Inventory | 1,260 | ☐ | |
| 19108 | 09/12/2005 | Inventory | 1,323 | ☐ | |
| 19110 | 09/12/2005 | Inventory | 1,418 | ☐ | |
| 19114 | 09/12/2005 | Inventory | 1,512 | ☐ | |
| 19632 | 10/05/2005 | Inventory | 1,071 | ☐ | |
| 19633 | 10/05/2005 | Inventory | 1,103 | ☐ | |
| 19634 | 10/05/2005 | Inventory | 1,355 | ☐ | |
| 19635 | 10/05/2005 | Inventory | 1,197 | ☐ | |
| 19638 | 10/05/2005 | Inventory | 1,134 | ☐ | |
| 20017 | 10/21/2005 | Inventory | 1,617 | ☐ | 49x11 |
| 20018 | 10/21/2005 | Inventory | 1,485 | ☐ | 45x11 |
| 20024 | 10/21/2005 | Inventory | 1,320 | ☐ | 40x11 |
| 20025 | 10/21/2005 | Inventory | 1,716 | ☐ | 52x11 |
| 20026 | 10/21/2005 | Inventory | 924 | ☐ | 28x11 |
| Total 15 | | | 19,801 | | |

https://demolt/Common/SupplierConnect/MillPortal/InventoryDetails.aspx?MillProductI Local intranet

*Fig. 11*

| Ticket Number | Created | Status | Unit Board Feet | Is Jag | Tally Notes |
|---|---|---|---|---|---|
| 14212 | 03/11/2005 | Sold | 1,620 | ☐ | block tally |
| 14969 | 03/11/2005 | Sold | 1,395 | ☐ | block |
| 14970 | 03/11/2005 | Sold | 1,440 | ☐ | block |
| 14971 | 03/11/2005 | Sold | 1,620 | ☐ | block |
| 14972 | 03/11/2005 | Sold | 1,800 | ☐ | block |
| 14973 | 03/11/2005 | Sold | 1,530 | ☐ | block |
| 14974 | 03/11/2005 | Sold | 1,620 | ☐ | block |
| 14975 | 03/11/2005 | Sold | 1,530 | ☐ | block |
| 14976 | 03/11/2005 | Sold | 1,800 | ☐ | block |
| 14977 | 03/11/2005 | Sold | 1,530 | ☐ | block |
| 14978 | 03/11/2005 | Sold | 1,710 | ☐ | block |
| 14979 | 03/11/2005 | Sold | 1,530 | ☐ | block |
| 14980 | 03/11/2005 | Sold | 1,350 | ☐ | block |
| 14987 | 03/11/2005 | Sold | 1,800 | ☐ | block |
| 15357 | 03/29/2005 | Sold | 1,312 | ☐ | 1x10 140 - 15 |
| 15458 | 04/05/2005 | Sold | 1,155 | ☐ | |
| 15459 | 04/05/2005 | Sold | 990 | ☐ | |
| 15460 | 04/05/2005 | Sold | 1,056 | ☐ | |
| Total 121 | | | 164,803 | | |

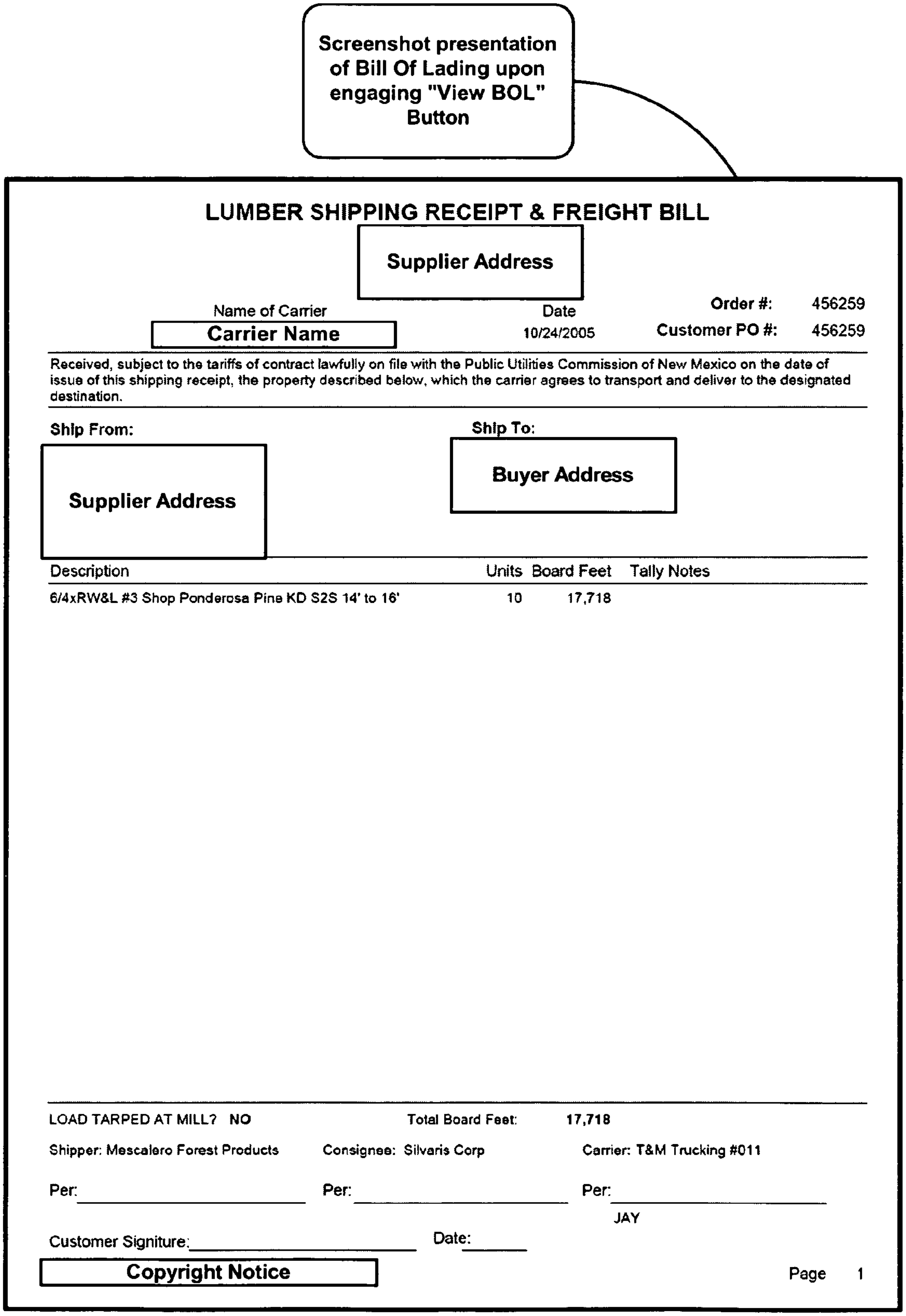

LUMBER SHIPPING RECEIPT & FREIGHT BILL

Supplier Address

Name of Carrier: Carrier Name
Date: 10/24/2005
Order #: 456259
Customer PO #: 456259

Received, subject to the tariffs of contract lawfully on file with the Public Utilities Commission of New Mexico on the date of issue of this shipping receipt, the property described below, which the carrier agrees to transport and deliver to the designated destination.

Ship From: Supplier Address

Ship To: Buyer Address

| Description | Units | Board Feet | Tally Notes |
|---|---|---|---|
| 6/4xRW&L #3 Shop Ponderosa Pine KD S2S 14' to 16' | 10 | 17,718 | |

LOAD TARPED AT MILL? NO
Total Board Feet: 17,718

Shipper: Mescalero Forest Products
Consignee: Silvaris Corp
Carrier: T&M Trucking #011

Per:______ Per:______ Per:______
JAY

Customer Signiture:______ Date:____

Copyright Notice

Page 1

*Fig. 18C*

> Screenshot presentation of Invoice upon engaging "View Invoice" button

| Supplier Address | | **Invoice** | |
|---|---|---|---|
| | | Invoice No.: 456259 | |
| | | Invoice Date: 10/24/2005 | |

Bill To:  Ship To:

| Wholesaler Billing Address | Buyer Shipping Address |
|---|---|

| PO # | Terms | Ship Date | Carrier |
|---|---|---|---|
| 456259 | 1% 10 Net 11 | 10/24/2005 | |

| Description | Units | Board Feet | Price/MBF | Amount |
|---|---|---|---|---|
| 6/4xRW&L #3 Shop Ponderosa Pine KD S2S 14' to 16' | 10 | 17,718 | $455.00 | $8,061.69 |

| | | | |
|---|---|---|---|
| Total Units: | 10 | Gross Invoice: | $8,061.69 |
| Total Board Feet: | 17,718 | Prompt Payment Discount: | $80.62 |
| | | Net Invoice: | $7,981.07 |
| | | (Payable in U.S. Dollars) | |

Copyright Notice

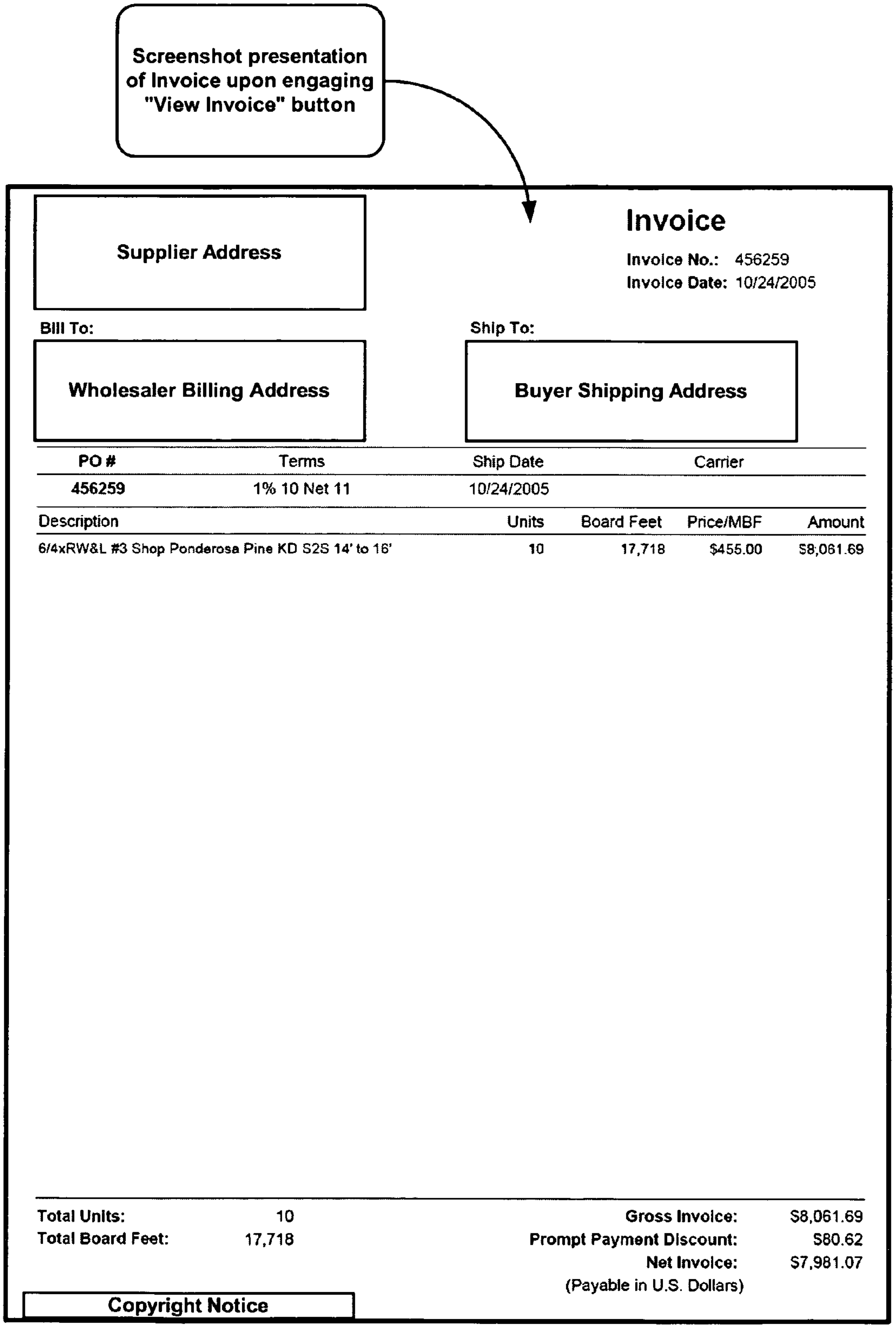

*Fig. 18D*

Screenshot presentation of BOL Editior upon engaging "Edit BOL" button

BOL Editor -- Web Page Dialog

Tracking #: 456259  Posted By: User Name
Carrier: Carrier Name  Driver: Driver Name  ☐ Tarped at Mill

| Ticket Number | Board Feet | Unit Price | Description |
|---|---|---|---|
| 19597 | 1,844 | $ 838.79 | 6/4xRW&L #3 Shop Ponderosa Pine KD S2S 14' to 16' |
| 19598 | 1,698 | $ 772.59 | 6/4xRW&L #3 Shop Ponderosa Pine KD S2S 14' to 16' |
| 19738 | 1,794 | $ 816.27 | 6/4xRW&L #3 Shop Ponderosa Pine KD S2S 14' to 16' |
| 19739 | 1,664 | $ 756.89 | 6/4xRW&L #3 Shop Ponderosa Pine KD S2S 14' to 16' |
| 19740 | 1,679 | $ 763.72 | 6/4xRW&L #3 Shop Ponderosa Pine KD S2S 14' to 16' |
| 19741 | 1,848 | $ 840.84 | 6/4xRW&L #3 Shop Ponderosa Pine KD S2S 14' to 16' |
| 19756 | 1,844 | $ 838.79 | 6/4xRW&L #3 Shop Ponderosa Pine KD S2S 14' to 16' |
| 19757 | 1,769 | $ 804.67 | 6/4xRW&L #3 Shop Ponderosa Pine KD S2S 14' to 16' |
| 19758 | 1,754 | $ 797.84 | 6/4xRW&L #3 Shop Ponderosa Pine KD S2S 14' to 16' |
| 19759 | 1,827 | $ 831.29 | 6/4xRW&L #3 Shop Ponderosa Pine KD S2S 14' to 16' |
|  | 17,718 | $ 8,061.69 |  Total BOL Items 10 |

https://demok/Common/SupplierConnect/MillPortal/BOLDetailsEdit.aspx?MillPickListID=2714   Local intranet

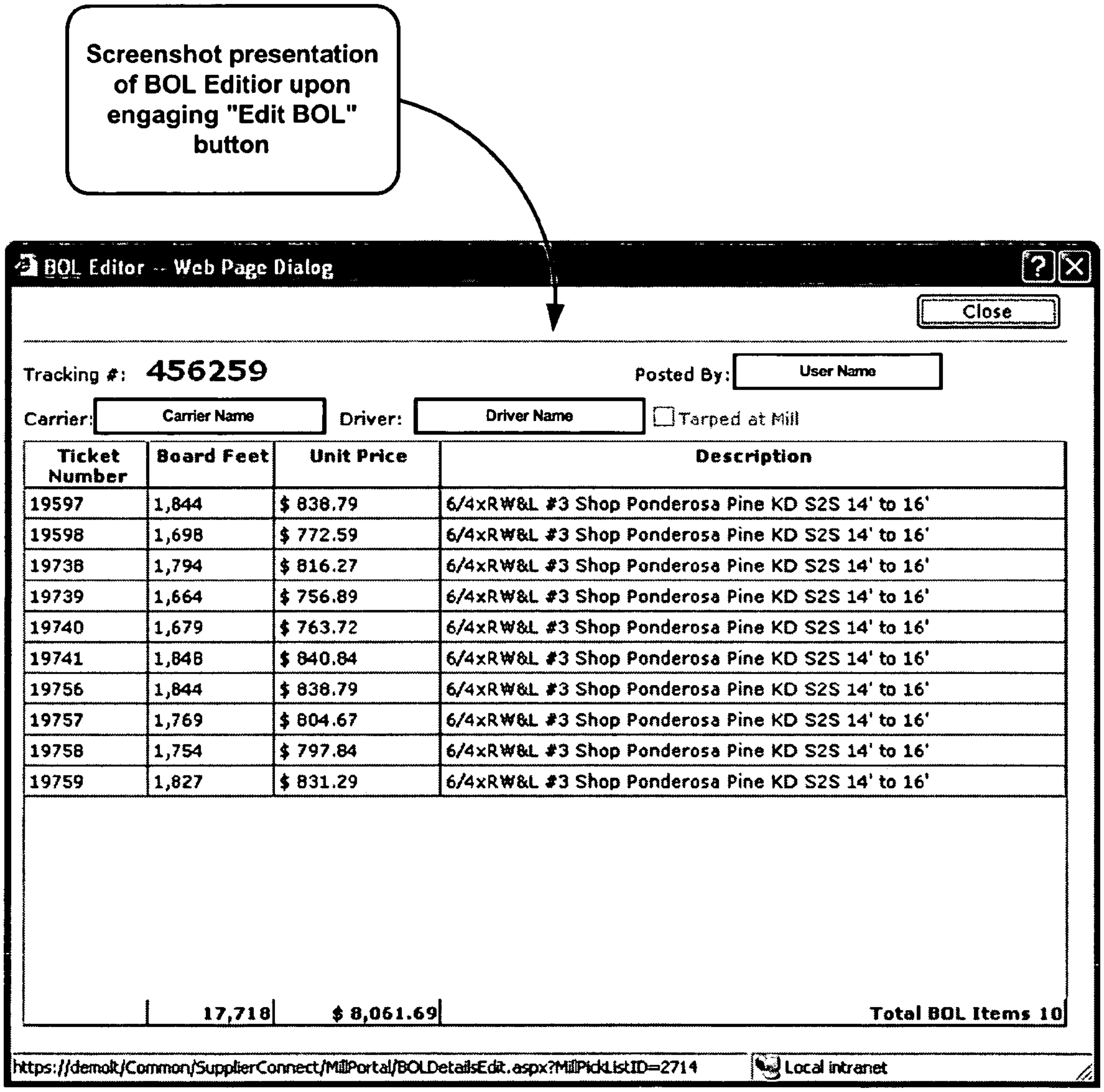

Inventory Report

Supplier Name

12A6-32

12/22/2005

3/4xRW&L Mill Run Ponderosa Pine Grn Rough 8' to 16'

| Ticket # | Tally Notes | Board Feet | Date Added |
|---|---|---|---|
| 18832 | | 1,366 | 08/26/2005 |
| 19059 | | 1,260 | 09/12/2005 |
| 19108 | | 1,323 | 09/12/2005 |
| 19110 | | 1,418 | 09/12/2005 |
| 19114 | | 1,512 | 09/12/2005 |
| 19632 | | 1,071 | 10/05/2005 |
| 19633 | | 1,103 | 10/05/2005 |
| 19634 | | 1,355 | 10/05/2005 |
| 19635 | | 1,197 | 10/05/2005 |
| 19638 | | 1,134 | 10/05/2005 |
| 20017 | 49x11 | 1,617 | 10/21/2005 |
| 20018 | 45x11 | 1,485 | 10/21/2005 |
| 20024 | 40x11 | 1,320 | 10/21/2005 |
| 20025 | 52x11 | 1,716 | 10/21/2005 |
| 20026 | 28x11 | 924 | 10/21/2005 |
| Total Tickets: 15 | | 19,801 | |

4/4xRW&L #1 & 3rd Clear Ponderosa Pine KD S2S 8' to 16'

| Ticket # | Tally Notes | Board Feet | Date Added |
|---|---|---|---|
| 19857 | | 2,110 | 10/17/2005 |
| 19859 | | 965 | 10/17/2005 |
| 19860 | | 647 | 10/17/2005 |
| 19862 | | 2,087 | 10/17/2005 |
| 19866 | | 1,612 | 10/17/2005 |
| Total Tickets: 5 | | 7,421 | |

6/4xRW&L #2 & Btr Shop Ponderosa Pine KD S2S 14' to 16'

| Ticket # | Tally Notes | Board Feet | Date Added |
|---|---|---|---|
| 14377 | | 1,361 | 02/18/2005 |
| 14403 | | 918 | 02/18/2005 |
| 14418 | | 330 | 02/18/2005 |
| 16701 | | 1,712 | 05/26/2005 |
| 17137 | | 1,709 | 06/08/2005 |
| 19746 | | 1,715 | 10/21/2005 |
| 19747 | | 1,791 | 10/21/2005 |
| 19748 | | 1,752 | 10/21/2005 |
| 19749 | | 1,707 | 10/21/2005 |
| 19750 | | 1,673 | 10/21/2005 |
| 19751 | | 1,734 | 10/21/2005 |
| 19752 | | 1,766 | 10/21/2005 |
| 19753 | | 1,758 | 10/21/2005 |
| Total Tickets: 13 | | 19,924 | |

6/4xRW&L #2 & Btr Shop Ponderosa Pine KD S2S 10' to 12'

| Ticket # | Tally Notes | Board Feet | Date Added |
|---|---|---|---|
| 16681 | | 219 | 05/25/2005 |
| Total Tickets: 1 | | 219 | |

Wholesaler Name

Page 1

Supplier Name

Average Board Footage Report

12A6-36

Date: 12/22/2005

| Product | Product Avg | Avg BF All Units | Count All Units | Active Units | Active Units |
|---|---|---|---|---|---|
| 1x10 Mill Run Ponderosa Pine AD Rough 8' to 16' | 1,296 | 1,357 | 26 | 1,582 | 5 |
| 1x12 Mill Run Ponderosa Pine AD Rough 8' to 16' | 1,457 | 1,503 | 16 | 1,620 | 1 |
| 1x4 Mill Run Ponderosa Pine AD Rough 8' to 16' | 1,184 | 1,215 | 171 | 1,187 | 9 |
| 1x6 Mill Run Ponderosa Pine AD Rough 8' to 16' | 1,293 | 1,350 | 166 | 1,441 | 9 |
| 1x8 Mill Run Ponderosa Pine AD Rough 8' to 16' | 1,337 | 1,325 | 41 | 1,632 | 2 |
| 2x12 Mill Run Ponderosa Pine AD Rough 8' to 16' | 2,243 | 2,119 | 12 | 0 | 0 |
| 2x12 Mill Run Ponderosa Pine Grn Rough 8' to 16' | 2,000 | 1,774 | 2 | 0 | 0 |
| 3/4xRW&L Mill Run Ponderosa Pine Grn Rough 8' to 16' | 1,393 | 1,357 | 136 | 1,320 | 15 |
| 3x12 Mill Run Ponderosa Pine AD Rough 8' to 16' | 1,780 | 1,780 | 16 | 0 | 0 |
| 4/4xRW&L #1 & 3rd Clear Ponderosa Pine KD S2S 8' to 16' | 2,000 | 1,464 | 5 | 1,484 | 5 |
| 4/4xRW&L #2 Shop Ponderosa Pine KD S2S 6' to 16' | 2,000 | 1,474 | 9 | 1,474 | 9 |
| 4/4xRW&L Mill Run Ponderosa Pine AD Rough 8' to 16' | 1,229 | 1,229 | 33 | 0 | 0 |
| 4/4xRW&L Moulding & Btr Ponderosa Pine KD S2S 6' to 16' | 2,000 | 1,287 | 6 | 1,287 | 6 |
| 4x6 Mill Run Ponderosa Pine AD Rough 8' and longer | 2,136 | 2,154 | 425 | 2,125 | 16 |
| 4x8 Mill Run Ponderosa Pine AD Rough 8' to 16' | 2,358 | 2,450 | 4 | 0 | 0 |
| 5/4xRW&L #2 & Btr Shop Ponderosa Pine KD S2S Random Length | 932 | 1,415 | 19 | 1,103 | 7 |
| 5/4xRW&L #3 & Btr Shop (Dim. P.O.) Ponderosa Pine KD S4S 6' to 16' | 1,500 | 1,790 | 2 | 0 | 0 |
| 5/4xRW&L #3 Shop Ponderosa Pine KD S2S Random Length | 1,442 | 1,599 | 67 | 1,838 | 1 |
| 5/4xRW&L Moulding & Btr Ponderosa Pine KD S2S Random Length | 1,128 | 1,244 | 6 | 729 | 3 |
| 5/4xRW&L Shop Outs Ponderosa Pine KD S2S 6' to 16' | 1,700 | 1,724 | 26 | 1,762 | 9 |
| 6/4xRW&L #2 & Btr Shop Ponderosa Pine KD S2S 10' to 12' | 1,022 | 1,022 | 6 | 219 | 1 |
| 6/4xRW&L #2 & Btr Shop Ponderosa Pine KD S2S 14' to 16' | 1,680 | 1,701 | 143 | 1,633 | 13 |
| 6/4xRW&L #2 & Btr Shop Ponderosa Pine KD S2S 6' to 8' | 401 | 401 | 2 | 444 | 1 |
| 6/4xRW&L #3 Shop Ponderosa Pine KD S2S 10' to 12' | 1,127 | 1,178 | 25 | 1,247 | 3 |
| 6/4xRW&L #3 Shop Ponderosa Pine KD S2S 14' to 16' | 1,742 | 1,756 | 267 | 1,774 | 35 |
| 6/4xRW&L #3 Shop Ponderosa Pine KD S2S 6' to 8' | 654 | 753 | 2 | 0 | 0 |
| 6/4xRW&L C & btr Ponderosa Pine KD S2S 6' to 16' | 1,700 | 1,040 | 2 | 0 | 0 |
| 6/4xRW&L Moulding & Btr Ponderosa Pine KD S2S 10' to 12' | 1,223 | 1,223 | 2 | 0 | 0 |
| 6/4xRW&L Moulding & Btr Ponderosa Pine KD S2S 14' to 16' | 1,654 | 1,712 | 50 | 1,292 | 3 |
| 6/4xRW&L Moulding & Btr Ponderosa Pine KD S2S 6' to 8' | 170 | 170 | 2 | 170 | 2 |
| 6/4xRW&L Shop Outs Ponderosa Pine KD S2S 10' to 12' | 1,197 | 1,137 | 5 | 0 | 0 |
| 6/4xRW&L Shop Outs Ponderosa Pine KD S2S 14' to 16' | 1,718 | 1,654 | 144 | 1,618 | 26 |
| 6/4xRW&L Shop Outs Ponderosa Pine KD S2S 6' to 8' | 465 | 630 | 3 | 465 | 1 |
| 6x8 Mill Run Ponderosa Pine AD Rough 8' to 16' | 2,072 | 2,072 | 6 | 0 | 0 |

Wholesaler Name

Page 1

Product Report

12A6-60

Supplier Location Two

12/22/2005

| Product Number | Product Description | Price |
|---|---|---|
| | OSB 4X8 Non-Cert 1/2 inch Square | $293.00 / MSFT |
| | OSB 4X8 Non-Cert 19/32 inch Square | $270.00 / MSFT |
| | OSB 4X8 Non-Cert 19/32 inch T&G Full | $270.00 / MSFT |
| | OSB 4X8 Non-Cert 23/32 inch Square | $314.00 / MSFT |
| | OSB 4X8 Non-Cert 23/32 inch T&G Full | $314.00 / MSFT |
| | OSB 4X8 Non-Cert 3/4 inch T&G or Square | $314.00 / MSFT |
| | OSB 4X8 Non-Cert 7/16 inch Square | $280.00 / MSFT |
| | OSB 4X8 Non-Cert 7/8 inch T&G or Square | $314.00 / MSFT |
| | OSB 4X8 Reject 1/2 inch Square | $270.00 / MSFT |
| | OSB 4X8 Reject 15/32 inch Square | $258.00 / MSFT |
| | OSB 4X8 Reject 19/32 inch Square | $221.00 / MSFT |
| | OSB 4X8 Reject 23/32 inch Square | $257.00 / MSFT |
| | OSB 4X8 Reject 7/16 inch Square | $258.00 / MSFT |
| | OSB 4X8 Util 15/32 inch Square | $280.00 / MSFT |

Total Products: 14

*Fig. 27*

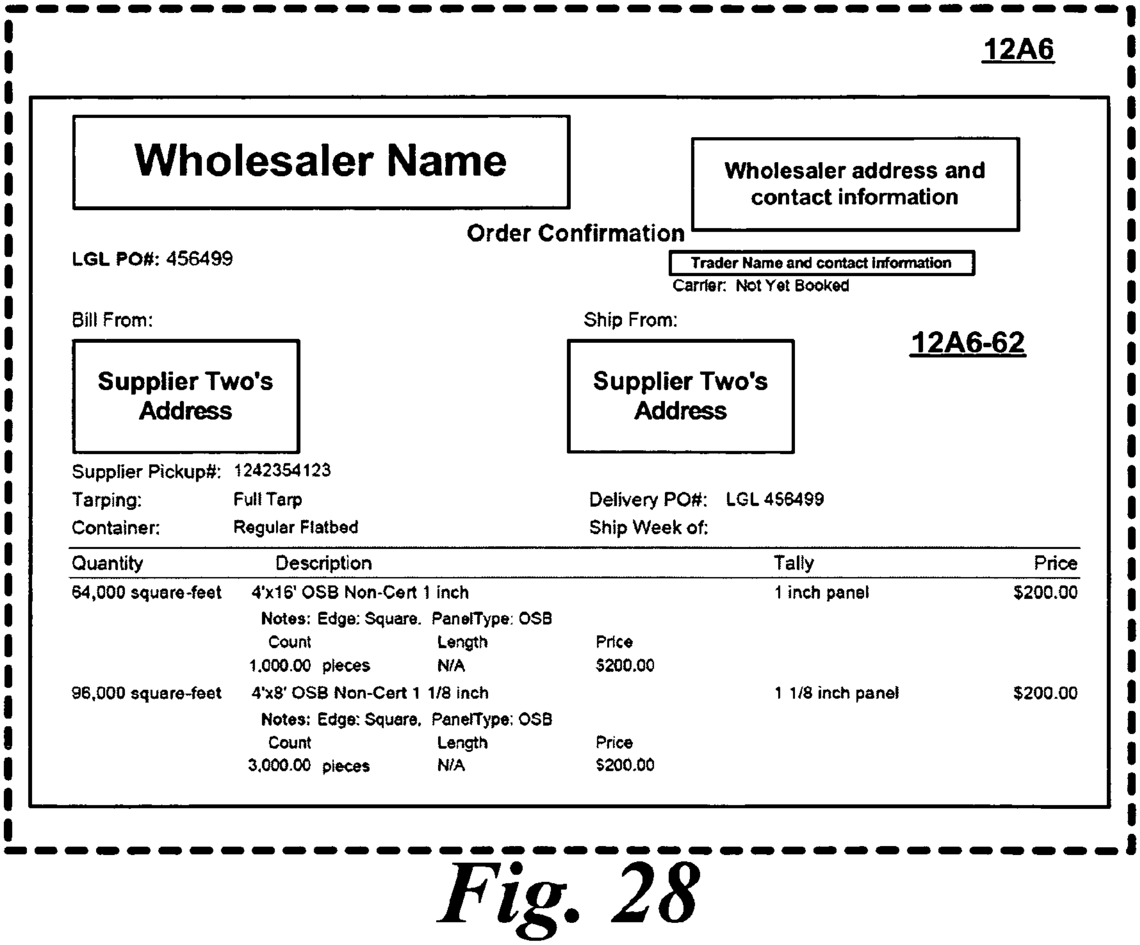
12A6

Wholesaler Name

Wholesaler address and contact information

Order Confirmation

LGL PO#: 456499

Trader Name and contact information

Carrier: Not Yet Booked

Bill From:

Supplier Two's Address

Ship From:

Supplier Two's Address

12A6-62

Supplier Pickup#: 1242354123

Tarping: Full Tarp

Container: Regular Flatbed

Delivery PO#: LGL 456499

Ship Week of:

| Quantity | Description | Tally | Price |
|---|---|---|---|
| 64,000 square-feet | 4'x16' OSB Non-Cert 1 inch<br>Notes: Edge: Square. PanelType: OSB<br>Count: 1,000.00 pieces; Length: N/A; Price: $200.00 | 1 inch panel | $200.00 |
| 96,000 square-feet | 4'x8' OSB Non-Cert 1 1/8 inch<br>Notes: Edge: Square. PanelType: OSB<br>Count: 3,000.00 pieces; Length: N/A; Price: $200.00 | 1 1/8 inch panel | $200.00 |

Active Order Carrier Report

Supplier Two's Products

Date: 12/22/2005

| Tracking # | Carrier | Pickup Date |
|---|---|---|
| 455332 | Not Booked Yet | 10/06/2005 |
| 456251 | Carrier #18 | 10/27/2005 |
| 456281 | Carrier # 45 | 10/28/2005 |
| 456339 | Carrier # 89 | 10/28/2005 |
| 456347 | Carrier # 10 | 10/25/2005 |
| 456349 | | 10/27/2005 |
| 456401 | Carrier # 76 | 10/27/2005 |
| 456402 | Carrier # 55 | 10/27/2005 |
| 456407 | Carrier # 21 | 10/25/2005 |
| 456410 | Carrier #7 | |
| 456414 | Carrier #92 | |
| 456440 | Carrier #4 | 10/28/2005 |

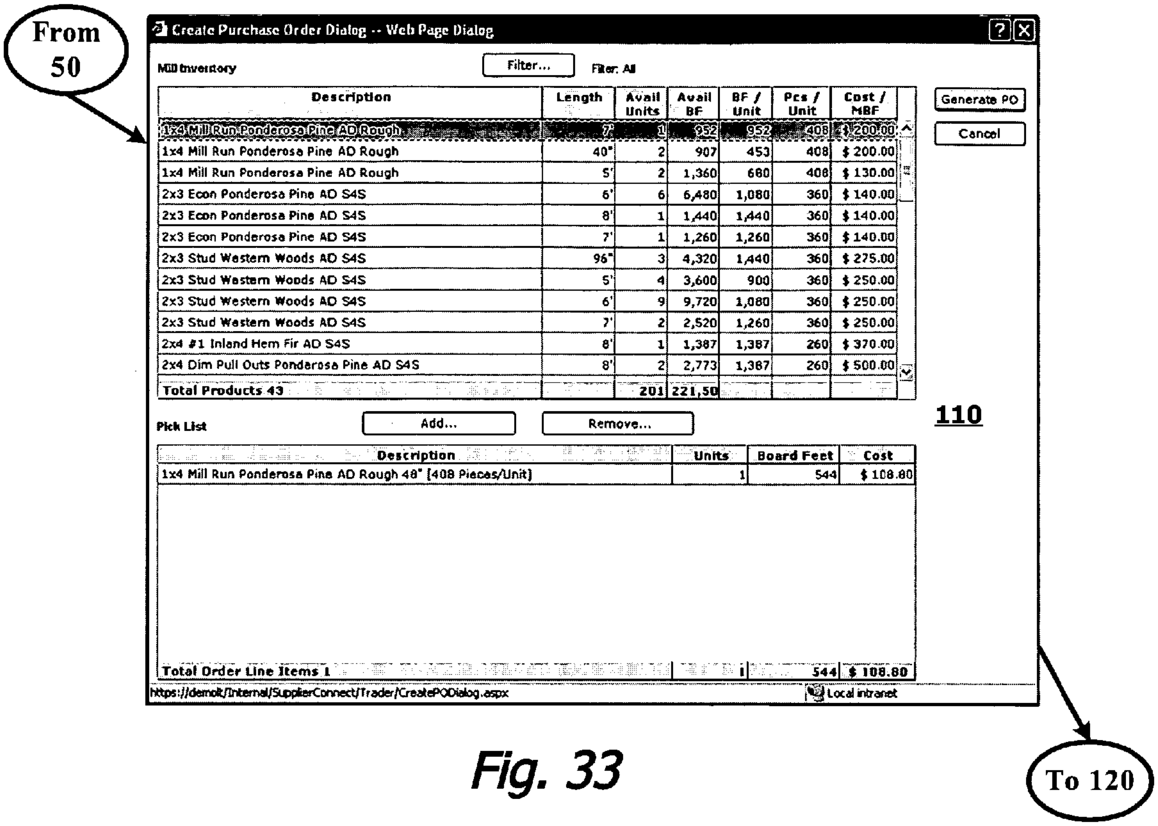

| Description | Length | Avail Units | Avail BF | BF / Unit | Pcs / Unit | Cost / MBF |
|---|---|---|---|---|---|---|
| 1x4 Mill Run Ponderosa Pine AD Rough | 7' | 1 | 952 | 952 | 408 | $ 200.00 |
| 1x4 Mill Run Ponderosa Pine AD Rough | 40" | 2 | 907 | 453 | 408 | $ 200.00 |
| 1x4 Mill Run Ponderosa Pine AD Rough | 5' | 2 | 1,360 | 680 | 408 | $ 130.00 |
| 2x3 Econ Ponderosa Pine AD S4S | 6' | 6 | 6,480 | 1,080 | 360 | $ 140.00 |
| 2x3 Econ Ponderosa Pine AD S4S | 8' | 1 | 1,440 | 1,440 | 360 | $ 140.00 |
| 2x3 Econ Ponderosa Pine AD S4S | 7' | 1 | 1,260 | 1,260 | 360 | $ 140.00 |
| 2x3 Stud Western Woods AD S4S | 96" | 3 | 4,320 | 1,440 | 360 | $ 275.00 |
| 2x3 Stud Western Woods AD S4S | 5' | 4 | 3,600 | 900 | 360 | $ 250.00 |
| 2x3 Stud Western Woods AD S4S | 6' | 9 | 9,720 | 1,080 | 360 | $ 250.00 |
| 2x3 Stud Western Woods AD S4S | 7' | 2 | 2,520 | 1,260 | 360 | $ 250.00 |
| 2x4 #1 Inland Hem Fir AD S4S | 8' | 1 | 1,387 | 1,387 | 260 | $ 370.00 |
| 2x4 Dim Pull Outs Ponderosa Pine AD S4S | 8' | 2 | 2,773 | 1,387 | 260 | $ 500.00 |
| Total Products 43 | | 201 | 221,50 | | | |

| Description | Units | Board Feet | Cost |
|---|---|---|---|
| 1x4 Mill Run Ponderosa Pine AD Rough 48" [408 Pieces/Unit] | 1 | 544 | $ 108.80 |
| Total Order Line Items 1 | 1 | 544 | $ 108.80 |

Sales Summary Report

Supplier Location Two

10/01/2005 - 10/21/2005

| PO# | Pickup# | Shipped To | Ship Date | Sales |
|---|---|---|---|---|
| 455113 | 393189 | Customer Name | 10/06/2005 | $27,900.10 |
| 455362 | 436851 | Customer Name | 10/13/2005 | $28,080.67 |

Total Orders: 2      Sales Totals:   $55,980.77

12A6

Sales Detail Report 12A6-84

Supplier Two

10/01/2005 - 10/21/2005

| PO# | Pickup# | Shipped To | | Ship Date |
|---|---|---|---|---|
| 455113 | 393189 | Customer Name | | 10/06/2005 |
| | Product Description | | | Sales |
| | 4'x8' OSB Reject 7/16 inch | | | $4,804.80 |
| | 4'x8' OSB Non-Cert 7/16 inch | | | $11,821.06 |
| | 4'x8' OSB Reject 23/32 inch | | | $7,790.59 |
| | 4'x8' OSB Non-Cert 23/32 inch | | | $3,483.65 |
| | | | Order Totals: | $27,900.10 |
| 455362 | 436851 | Customer Name | | 10/13/2005 |
| | Product Description | | | Sales |
| | 4'x8' OSB Reject 7/16 inch | | | $2,104.13 |
| | 4'x8' OSB Non-Cert 7/16 inch | | | $9,045.50 |
| | 4'x8' OSB Reject 23/32 inch | | | $1,460.74 |
| | 4'x8' OSB Non-Cert 23/32 inch | | | $5,806.08 |
| | 4'x8' OSB Non-Cert 1/2 inch | | | $2,924.54 |
| | 4'x8' OSB Reject 19/32 inch | | | $4,961.28 |
| | 4'x8' OSB Non-Cert 19/32 inch | | | $1,778.40 |
| | | | Order Totals: | $28,080.67 |
| Total Orders: 2 | | | Total Sales: | $55,980.77 |

Product Report

Supplier Two's Products

12A6-86

10/21/2005

| Product Number | Product Description | Price |
|---|---|---|
| 10401 | OSB 4X8 Non-Cert 1/2 inch Square | $293.00 / MSFT |
| 10455 | OSB 4X8 Non-Cert 19/32 inch Square | $270.00 / MSFT |
| 10456 | OSB 4X8 Non-Cert 19/32 inch T&G Full | $270.00 / MSFT |
| 10606 | OSB 4X8 Non-Cert 23/32 inch Square | $314.00 / MSFT |
| 10607 | OSB 4X8 Non-Cert 23/32 inch T&G Full | $314.00 / MSFT |
| 10711 | OSB 4X8 Non-Cert 3/4 inch T&G or Square | $314.00 / MSFT |
| 10213 | OSB 4X8 Non-Cert 7/16 inch Square | $280.00 / MSFT |
| 10855 | OSB 4X8 Non-Cert 7/8 inch T&G or Square | $314.00 / MSFT |
| 10415 | OSB 4X8 Reject 1/2 inch Square | $270.00 / MSFT |
| 10311 | OSB 4X8 Reject 15/32 inch Square | $258.00 / MSFT |
| 10485 | OSB 4X8 Reject 19/32 inch Square | $221.00 / MSFT |
| 10621 | OSB 4X8 Reject 23/32 inch Square | $257.00 / MSFT |
| 10256 | OSB 4X8 Reject 7/16 inch Square | $258.00 / MSFT |
| | OSB 4X8 Util 15/32 inch Square | $280.00 / MSFT |

Total Products: 14

*Fig. 38*

SupplierConnect™

SupplierConnect™ Framework

SYSTEM FOR CATEGORIZING INVENTORY AND SECURING PURCHASE AND SALE

PRIORITY CLAIM

This application claims priority to U.S. provisional patent application Ser. No. 60/642,127 filed Jan. 7, 2005 and to U.S. provisional patent application Ser. No. 60/644,327 filed Jan. 13, 2005 and U.S. provisional patent application Ser. No. 60/690,407 filed Jun. 13, 2005. All of the above applications are hereby incorporated by reference in their entirety as if fully set forth herein.

COPYRIGHT NOTICE

This disclosure is protected under United States and International Copyright Laws. ©Silvaris Corporation. All Rights Reserved. A portion of the disclosure of this patent document contains material which is subject to copyright protection. The copyright owner reserves all copyright rights whatsoever.

FIELD OF THE INVENTION

This invention relates generally to network and Internet based computer software and systems to facilitate more efficient and convenient purchase and sale of items of inventory.

BACKGROUND OF THE INVENTION

Selling anything incurs transaction costs. Transaction costs include, among other things, the cost of the seller and buyer interested in any particular goods or services even finding each other, and then effectively and efficiently communicating and reaching agreement as to all relevant terms. Transactions costs, especially with respect to some goods, services and industries, are relatively and unnecessarily high. There is a need to reduce these and related transaction costs.

BRIEF DESCRIPTION OF THE DRAWINGS

Embodiments of the present invention are described in detail below with reference to the following drawings.

FIGS. 7-23 depict a series of SupplierConnect™ screenshot examples visible between supplier and wholesaler that help implement many of the embodiments described herein, including, without limitation, the methods and systems of FIGS. 4 and 5, and the 12A-16 link of FIG. 6;

FIGS. 24-29 depict a series of PONow™ screenshot examples visible between supplier and wholesaler of the methods and systems of multiple features and embodiments described herein, including the methods and systems of FIGS. 4 and 5, and the 12A-16 link of FIG. 6;

FIGS. 33-34 illustrate screenshots arising from steps 110 and 112, respectively, of sub-process 100 of FIG. 32;

FIG. 37 presents another screenshot having tabular listings of dated transactions; and FIG. 38 presents yet another screenshot having tabular listings of dated transactions.

DETAILED DESCRIPTION OF THE PREFERRED EMBODIMENTS

Transactions for products occur between supplier (or seller) and the buyer (products can include goods or services, but for ease of reference only generally will be referred to as products or goods). The supplier is typically, but not necessarily, the initial owner of the products or by-products that are made available for sale. In some currently preferred embodiments, the buyer may be an end customer or user, in others a wholesaler or reseller or distributor. Merely for ease of reference each herein will generally be referred to interchangeably as a buyer or wholesaler, unless the context clearly suggests or requires otherwise. The buyer preferably acquires temporary or permanent ownership of the supplier's products, though not necessarily physical possession of the supplier-sourced products. In some currently preferred embodiments, the buyer takes title. However, in alternate embodiments, the "buyer" may act more as a broker and does not acquire title. Embodiments of the invention may operate effectively in either or both situations.

Embodiments of methods and systems to facilitate or enable more convenient and efficient sale of inventory, by reducing transaction costs, employing computer software, remote communications and/or the Internet, are described with reference to the figures below.

Figure 1:
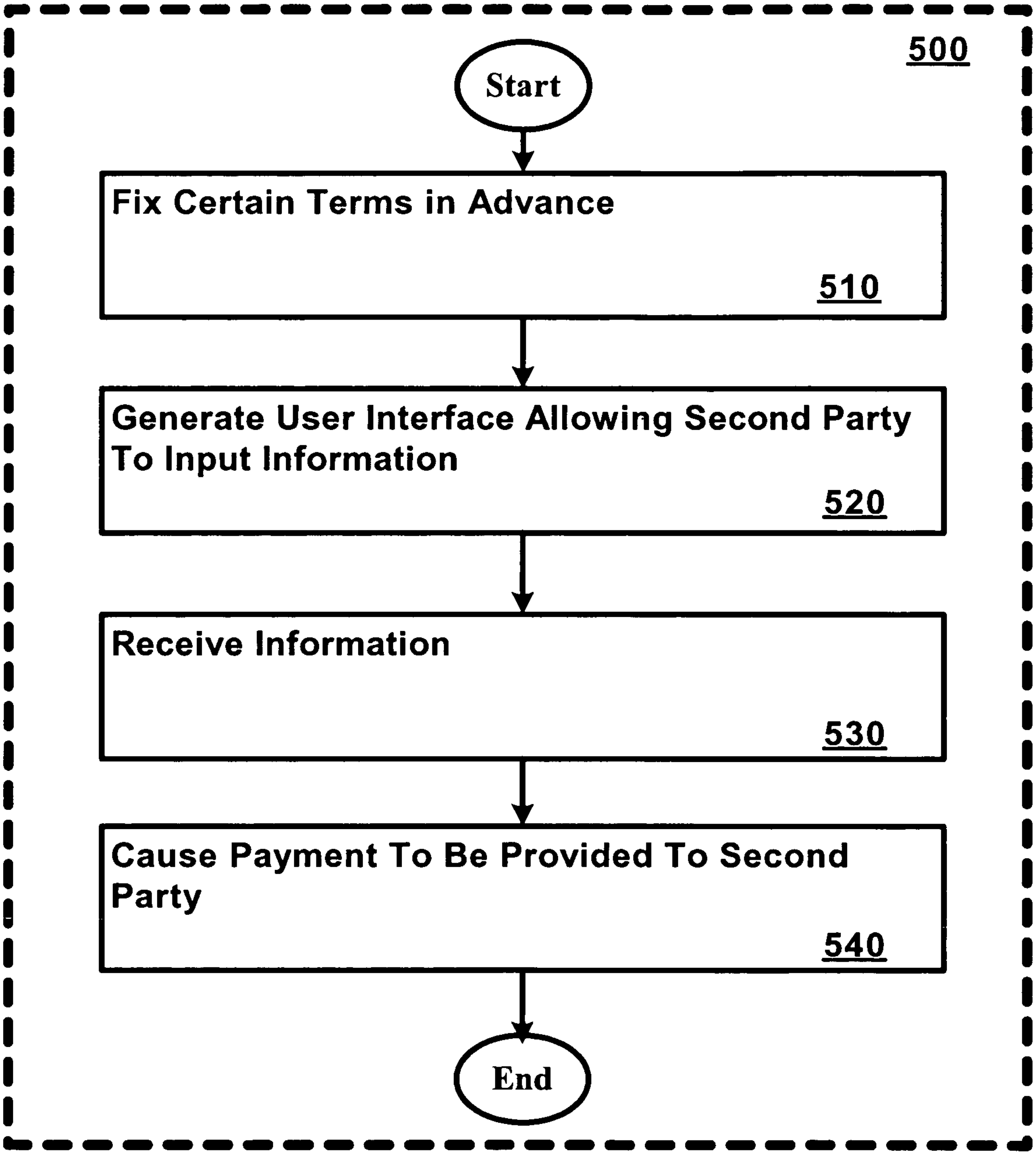
FIG. 1 illustrates an overview of a process of a system and method to facilitate more convenient and efficient purchase and sale of inventory.

FIG. 1 illustrates a process 500, according to an embodiment of the invention, which may be implemented by a buyer, to facilitate a sale by a supplier, or purchase by a buyer, of an item or items of inventory. The process 500 is illustrated as a set of operations shown as discrete blocks. The process 500 may be completely or partially implemented in any suitable hardware, software, firmware, combination thereof, and/or computer-readable media. The number and order in which the operations are described is not to be necessarily construed as a limitation.

At a block 510, a supplier and a buyer agree to certain fixed terms to govern a certain range of purchase transactions. For example, if the supplier is a lumber mill, the buyer may commit in advance to pay for and take title in all or some of the mill's existing and future lumber production, at certain prices for certain types of goods, according to certain characteristics of the goods, or other variables. As a more specific example, the buyer and seller may agree that, pending further notice, the buyer will buy any 2×4, 2×6, 2×8 or 2×10 of grade #3 or better that seller can produce for $0.25/board foot, fob mill, net 30. Alternatively, and/or additionally, the buyer, (in this case acting as wholesaler or broker) may receive a commitment from one or more downstream buyers to pay for and take title in all or some of the mill's lumber production. The terms need not be static. For example, the price might be tied to a specific third party market index or benchmark, plus or minus a margin. In this latter case, the formula is agreed in advance, but the price itself may fluctuate. In any case, at this block 510, the price and other terms agreed at this time are set, and need not be revisited on a per transaction basis. So, once the system is implemented with respect to a particular order for or purchase of a selected quantity of 2×4s, the only variable that need be addressed is the quantity and destination, for example. While any number of variables may be agreed in advance, in a preferred embodiment all variables are addressed in advance except specific items and specific destination to ship them to so as to minimize transaction costs per transaction.

At a block 520, a displayable user interface, accessible over a network by the supplier, is generated. The user interface is operable to allow the supplier to input information describing one or more items of inventory. For example, the buyer may maintain a web site from which the mill may access one or more web pages over the Internet. The one or more web pages may provide to the mill a user interface including one or more fields into which the mill may enter data describing one or more items of production, or preferably its entire inventory. In an exemplary embodiment, the mill may enter a description of a parcel of lumber that is ready for pickup and delivery. Alternatively and/or additionally, the supplier may obtain information about its available inventory and submit it without accessing the user interface. For example, a mill supplier may collect data concerning inventory with a bar code scanner, and upload it the data directly to a network at block 530 without accessing a user interface. Alternatively, the supplier may submit data only, e.g., EDI/XML from other inventory software systems.

At a block 530, the information is received over the network. For example, after entering the parcel description, the mill may select a "Submit" button generated in the user interface, thereby causing the description to be received by a server hosting the wholesaler's web site. Alternatively, the data may be submitted automatically at specified intervals, available continuously, or according to some regimen or program. In one embodiment, optimized for traditional or customary business expectations in some industries, the information provided includes the fact that the goods have been actually loaded onto a carrier for shipment and delivery, and the details of such goods and load, before proceeding to step 540 for payment.

At a block 540, the payment is caused to be provided to the supplier. For example, upon receiving information on the available parcel of lumber, the buyer (here acting as wholesaler or broker) may locate a third party willing to purchase the parcel. As will be discussed, in one embodiment, certain transactional advantages are offered by the wholesaler. For example, PONow™ technologies described below allows the supplier to demand or obligate the wholesaler to purchase all or other agreed-upon ranges of inventories from the supplier whether or not the wholesaler has or ever will be able to locate a downstream third-party buyer or group of third-party buyers to purchase the supplier inventory now owned by the wholesaler. In this embodiment, the risks of ownership (these include, without limitation, risk of storage, transit, loss, and inability to find a buyer) are shifted to the wholesaler. This shift of risks is sometimes preferred or optimal, or even presently commercially unavailable as an option in some industries, in part because such a commitment in advance is much more risky for a buyer, or practically not feasible without the advantages of certain other aspects of some embodiments of the invention described herein. For example, the embodiments that allow the buyer constant real-time convenient access to seller's inventory, and to instantly initiate purchase transactions, may make assumption of these risks worthwhile in situations where it would not be worthwhile otherwise.

Upon receiving a P.O. or bill of lading in the system, the wholesaler may remit to the mill payment for, and take title in, the parcel. Subsequently, the wholesaler may sell the parcel to the third-party buyer. Alternatively, upon locating a willing third-party buyer, the wholesaler (in effect now a broker) may facilitate the third-party buyer's payment to the mill for the parcel, thereby causing title in the parcel to pass directly from the mill to the third-party buyer.

Specifically, and still referring to block 540, in an embodiment, causation of the payment is in response to receipt of the information as described with reference to block 530. For example, the mill and wholesaler may make a predetermined agreement that the mill's submission (i.e., sending) to the wholesaler, or receipt by the wholesaler from the mill, of information relating to the parcel creates a purchase order for the parcel. In another embodiment, the information may include information customarily found in a bill of lading, indicating that the goods have been loaded for delivery. In either and/or both variations, in a preferred embodiment the creation of the purchase order or the bill of lading directly or indirectly creates an obligation, pursuant and subject to the terms agreed at step 510, on the part of the wholesaler to remit payment to the mill for the parcel. Depending on the embodiment, this obligation may arise irrespective of whether the wholesaler has located or will locate a third-party buyer of the parcel or item(s) of inventory.

Initiation of Transactions—"Pull" vs. "Push"

Figure 2:
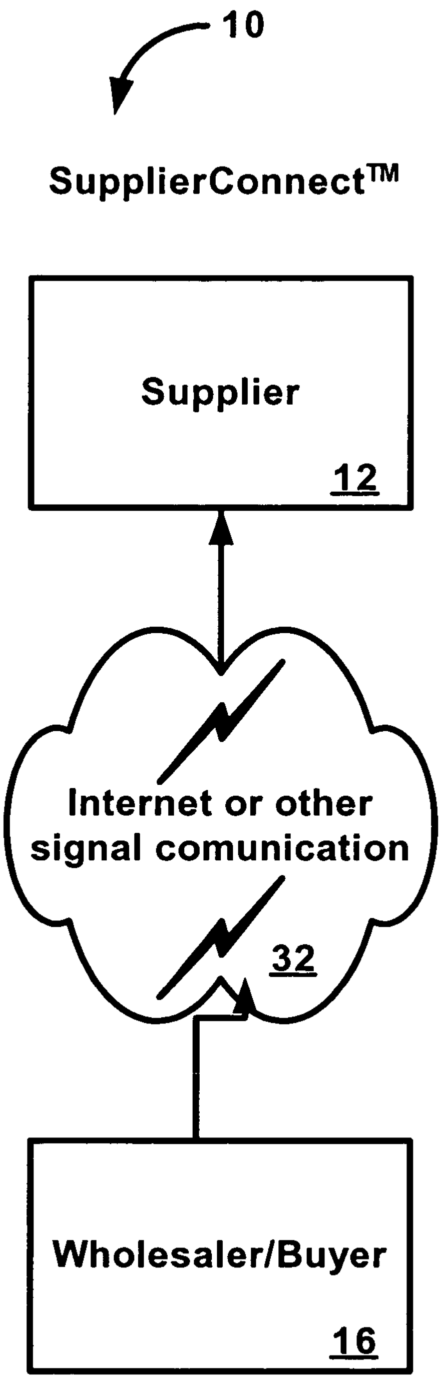
FIG. 2 is an overview of an alternate embodiment of a process of a system and method to facilitate more convenient and efficient purchase and sale of inventory utilizing non-Internet communications.

For multiple embodiments described herein, there are at least two principal operational instances or directional modes. In one mode, the buyer (or wholesaler) initiates the transaction, as shown in FIG. 2. This mode is generally referred to herein as SupplierConnect™ (this is the current trademark applicant uses for an embodiment. It is used merely for convenience, and is not to be construed as a limitation). In the SupplierConnect™ mode or embodiment, the buyer has (with the supplier's pre-arranged consent), conceptually and/or literally a "window" into the supplier's actual inventory, and reaches through the window to "pull" inventory from the seller, and effectively purchase it via that same window, as will be described herein.

Preferably, that window is in the form of computer access into a database populated with inventory data provided by the supplier. The supplier, as mentioned above, can provide that data in multiple ways, but preferably provides it from their own location, to be stored remotely in servers at, or at least accessible by, the buyer.

In this mode, preferably, the buyer may also contract in advance to purchase some or all of the inventory upon certain terms. The supplier consents to this arrangement because of convenience and reduction of the supplier's transaction costs. Specifically, most or all of the burden of communicating the details concerning available inventory has been reduced, and/or shifted primarily onto the buyer. These advantages can be especially beneficial, for example, with goods or services where the transactions costs are high relative to profit margins for the seller. (Such as, by way of example, in a market for seconds, defective goods, returns, lumber, etc.) In other embodiments, as will be discussed in greater detail below under SupplierConnect™ technologies, all or substantially all of the inventory from the supplier is obligated to be purchased by the wholesaler.

Further, in embodiments where the buyer commits in advance to purchase some or all of the inventory upon specified terms (e.g., price, goods, quantity, payment, and shipment details and execution), per-transaction negotiation costs are also substantially reduced. Thus, in preferred embodiments of this mode, the supplier is essentially or completely relieved of any burden of disposing of inventory; in a very real sense, once the supplier enters its inventory data into the system, the supplier's inventory simply gets hauled away and the money comes in.

Figure 3:
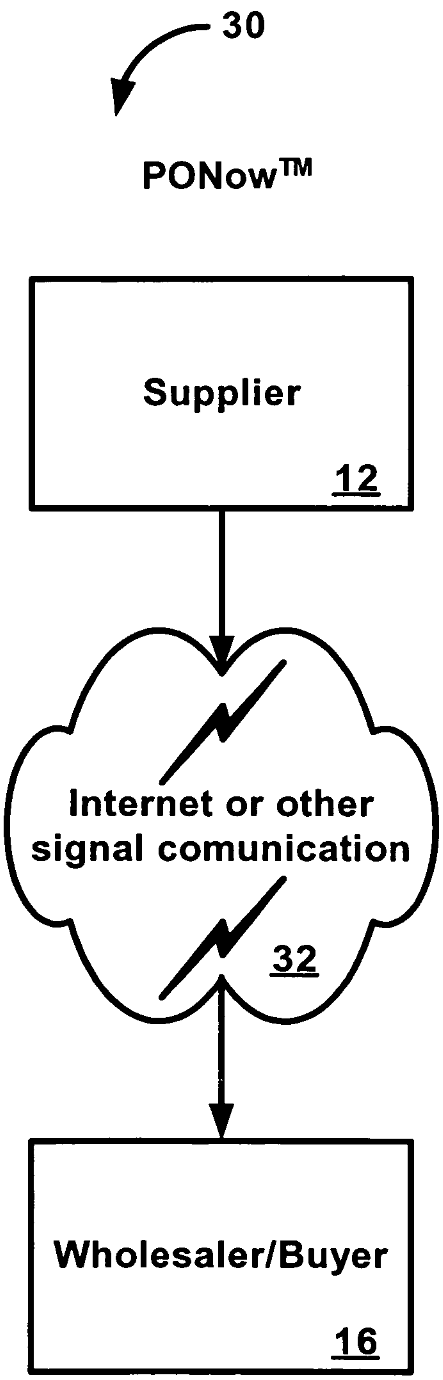
FIG. 3 is an overview of an alternate embodiment of a process of a system and method to facilitate more convenient and efficient purchase and sale of inventory utilizing Internet communications.

Conversely, in another ("push") mode, the seller (or supplier) initiates the transaction, as shown in FIG. 3. In this embodiment, contrary to traditional commerce, the seller can issue a purchase order (PO) for the buyer, obliging the buyer to purchase according to pre-arranged terms. In this patent application, this embodiment or mode is sometimes referred to as PONow™ (this is the current trademark applicant uses for an embodiment. It is used merely for convenience, and is not to be construed as a limitation). In this mode, in some embodiments, unlike SupplierConnect™, the buyer does not have a window into the sellers' inventory, but only sees the inventory the seller chooses to sell, and only then. In other embodiments, the buyer can see some or all of the inventory sometimes, or at all times.

Many of the features, functions or other embodiments described herein can be used with either or both modes. Moreover, in some embodiments, some or all of the functions of both modes can be combined into a single application, system, solution, or service. Both modes or embodiments optionally can utilize Internet or non-Internet communications. Schematically, as shown in FIGS. 3 and 4, the system includes a supplier 12, in signal communication or Internet-based communication 32 with a buyer 16.

Figure 4:
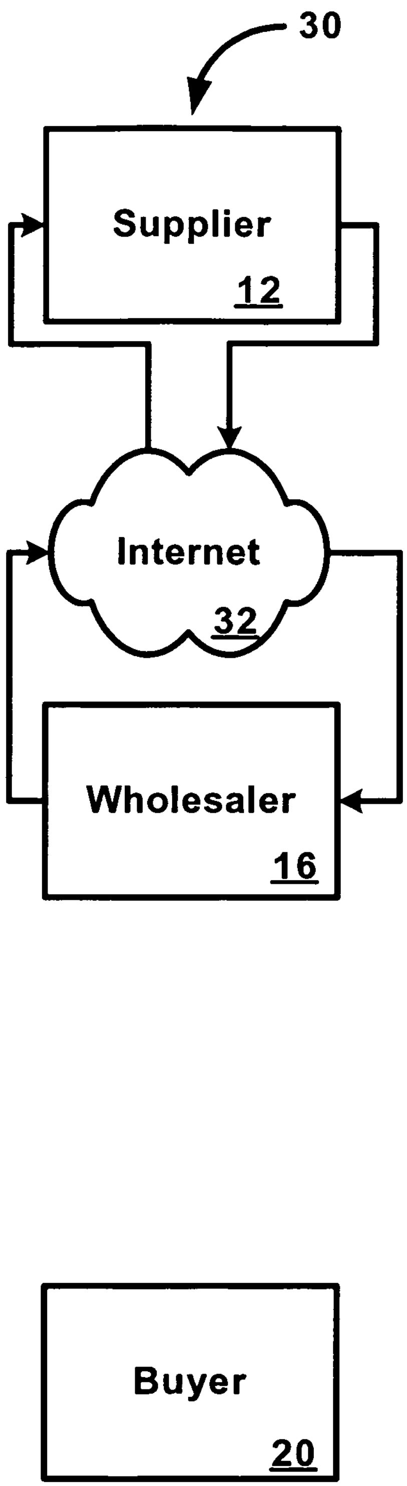
FIG. 4 is a schematic depiction of the methods and systems during transactions between supplier and wholesaler.

FIG. 4 is a schematic depiction of the Internet-based system during transactions between supplier and wholesaler. An example of transactions between the supplier and wholesaler occurs when the wholesaler 16 provides inventory tracking or management software tools or interfaces to the supplier 12, preferably (but not necessarily) on a hosted model and communicated via the Internet 32. Alternatively, the wholesaler 16 may send to the supplier, by regular mail or direct delivery, software tools to help the supplier facilitate communication with the buyer for either the PONow™ or SupplierConnect™ modes. For example, the software could be installed on the supplier's own computer network at their own location, and configured to send the data to the buyer, or made accessible by the buyer from the buyer's remote location. Alternatively, in some embodiments, the functionality described herein could be provided via an ASP model.

Still alternatively, the inventory management or tracking software tools may be completely or partially served to the supplier via the Internet 32 by a server (not shown) operating on behalf of the wholesaler. The system software tools as applied by the wholesaler 16 may include and/or be provided by microprocessor-executable software algorithms as will be described below.

Preferably, among the tools provided by wholesaler 16 to the supplier 12 are software-based tools for the supplier to use to conveniently and intuitively classify the suppliers' products, based on an intelligent adaptive user interface powered by a detailed taxonomy engine that pre-processes qualitative and quantitative features. Preferably, system 30 includes executable procedures that permit the wholesaler 16 to instantly purchase (and contractually acquire title to) the suppliers' taxonomically categorized product. As will be further discussed below, the wholesaler 16 need not take physical possession of the suppliers' classified products, only the ownership (i.e., title) to the classified products. That is, the classified products that the wholesaler owns, however transitory such ownership may be, remain at the suppliers' location until the products are subsequently delivered to the buyer 20. Preferably included in the tools offered by the wholesaler 16 include an Account Manager that defines all products the seller is willing to sell and the wholesaler 16 is willing to buy, subsequently updates the price the wholesaler 16 is willing to pay the supplier 12 based on previously agreed terms. Price updates automatically appear on the web page interfaces accessible by the supplier 12 as the supplier logs-on to the interface. This feature eliminates the need for the supplier to access a physical or online manual of industry prices from third party sources, and then correlate them to each line item of the particular goods in question. An additional benefit of this embodiment is that the "deal" and set price is visible to both parties. Prices, however set, are viewable in addition to being "baked in" automatically to transactions. The system described herein will automatically do that research for the supplier, and correlate and apply the relevant prices to the specific items or goods listed in the supplier's purchase order, and/or bill of lading.

Figure 5:
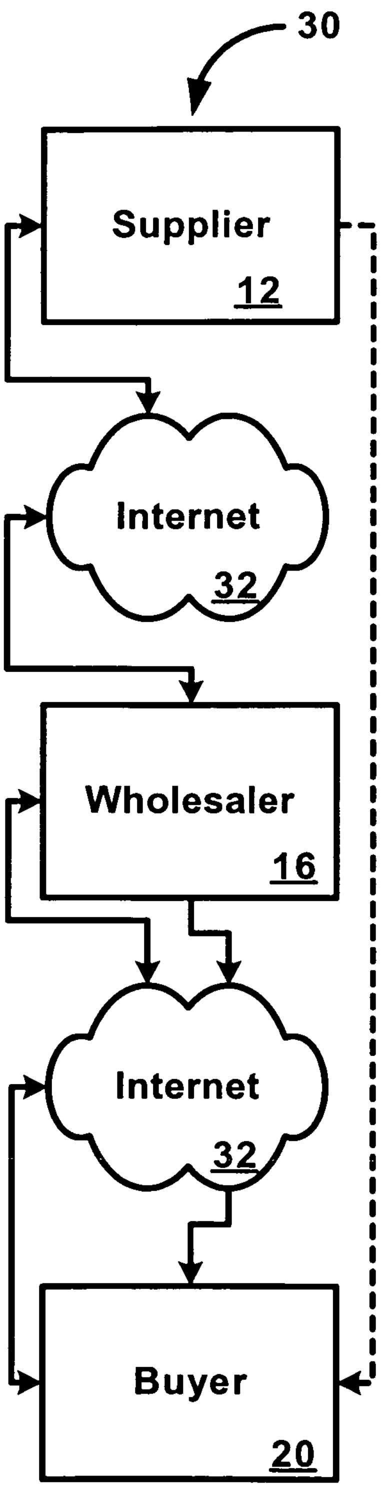
FIG. 5 is a schematic depiction of transactions between supplier and wholesaler and between supplier and buyer.

FIG. 5 is a schematic depiction of transactions between supplier 12 and wholesaler 16, and between supplier 12 and buyer 20. The system 30 shows supplier and wholesaler transactions via solid channel lines through the Internet 32 and between solid communication channel lines between the wholesaler 16 and the buyer 20. Delivery of the products is arranged by the wholesaler 16 for delivery to the buyer 20 from the supplier 32 as indicated by the dashed-line channel. Alternatively, delivery may be arranged by the supplier 32 and/or buyer 20. In a preferred embodiment to maximize convenience to the supplier, the wholesaler makes all arrangements for pickup and delivery, and provides an interface viewable by the supplier to manage only those variables of concern to the supplier (see, e.g., FIG. 29, Active Order Carrier Report).

Figure 6:
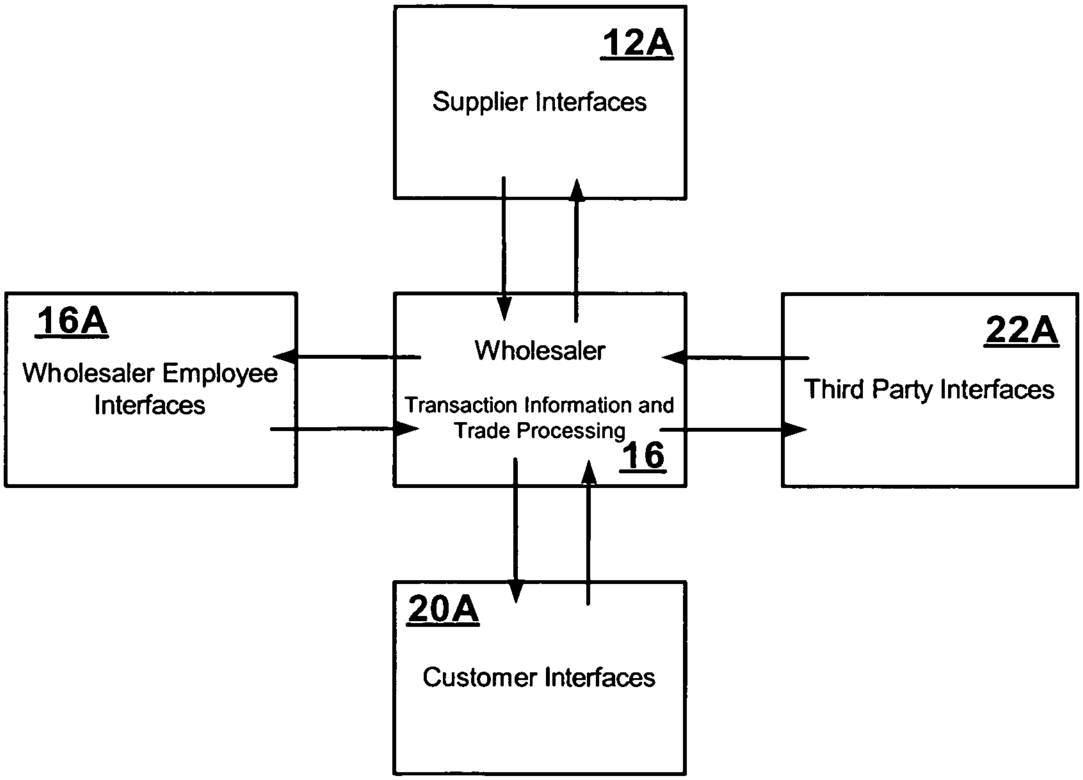
FIG. 6 is a schematic diagram of web or other communication and transaction interfaces provided for transacting parties in or for various embodiments of the methods and systems described in this application.

FIG. 6 is a schematic diagram of web or other communication and transaction interfaces provided for transacting parties in or for various embodiments of the methods and systems described in this application. As the wholesaler gathers information concerning the supplier's inventory through operation of the embodiments described herein, the wholesaler may use that data, or other related thereto or derived therefrom, in other of its internal software systems and processes to facilitate more efficient transactions with the other indicated parties. For example, the wholesaler may act as a conduit for transmission of transaction information and for trade processing. In some embodiments, under pre-arranged conditions, the supplier interface may be accessed by, for example, mills, and other suppliers.

The wholesaler 16 may provide at least one web-based customer/buyer interface that may be accessed via the internet by multiple buyer candidates. The multiple buyer candidates include prospective and actual customers. The wholesaler may also make available third-party interfaces to those parties having an interest in supplier-to-buyer business transactions. Among the third party interface groups may be carriers such as shipping companies of various types, for example, trucking ships, and aircraft and railroad, reloads or other warehousing and product handling facilities, strategic partners, customs brokers, and others.

FIGS. 7-23 depict a series of SupplierConnect™ screenshot examples of the embodiments and functions described above and visible to the supplier and buyer. Screenshot examples include supplier and buyer (or wholesaler) interface web presentations for Home, Inventory, Orders, Reports, and wholesaler contact information including product taxonomy or classification and those pertinent to orders and reports. These are examples of additional features to help the supplier manage its own inventory more conveniently. While most or all of these features are regarded as beneficial and useful for the preferred embodiment, any one or combination of these additional features described in these Figures may be omitted or altered without departing from the spirit and scope of the invention. In another embodiment, inventory information is viewable online for traders to determine product types and quantities that are available for sale. In yet another embodiment, the orders sold are viewable online by carriers so that arrangements may be made by the supplier to load trucks and notify the wholesaler when payment is due.

Some embodiments of the invention comprise various specific combinations or sub-combinations of the features or enhancements described, with or without the SupplierConnect™ or PONow™ modes included. Preferably, however, most or all of the inventory management software tools are beneficially combined with either the SupplierConnect™ or PONow™ modes (or both) included.

Figure 7:
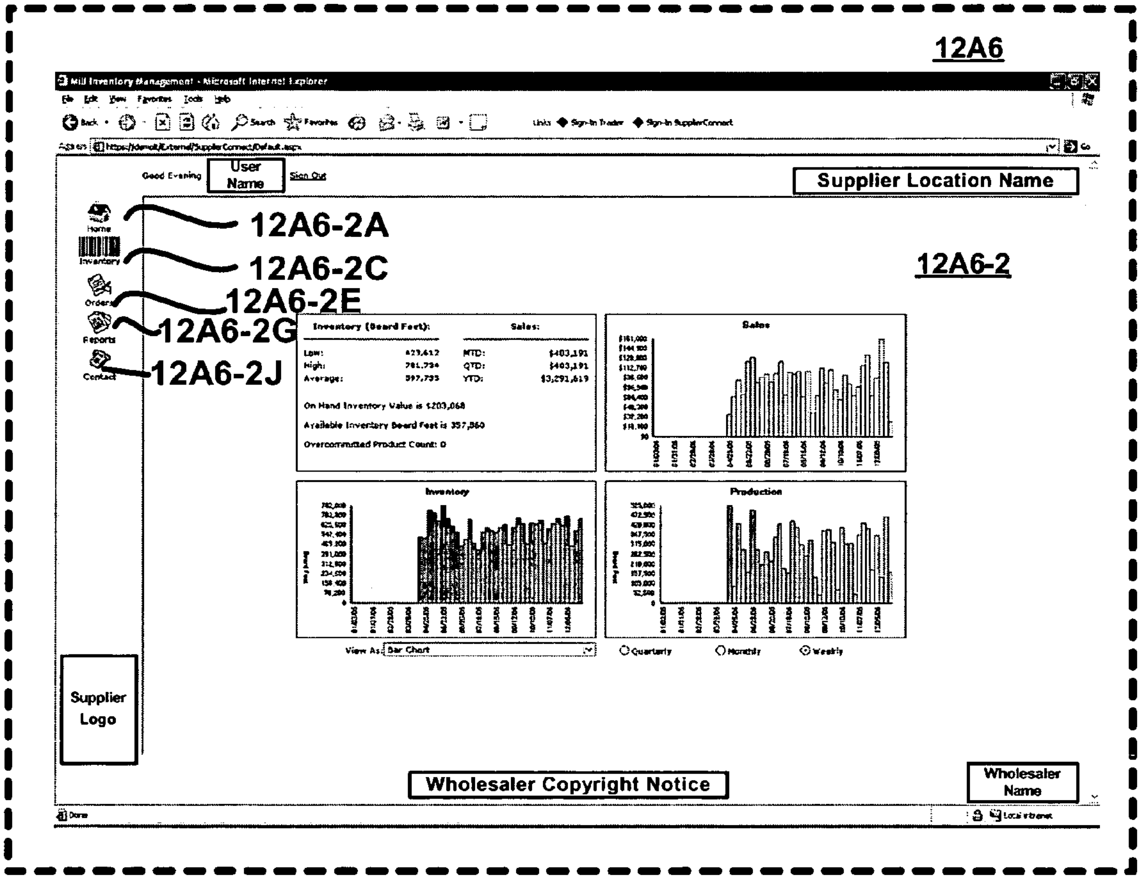

FIG. 7 is a screenshot at 12A6-2 arising after home icon 12A6-2A is engaged by either the wholesaler 16 or the supplier 12. Other icons include an inventory icon 12A6-2C and order icon 12A6-2E, a report icon 12A6-2G, and a contact icon 12A6-2J. Shown in screenshot 12A6-2 is a graphic depiction of available inventory in bar chart format that includes sales, inventory, and production, along with an alphanumeric table that itemizes inventory as board feet, low, medium, and average on an inventory value, available inventory board feet, and a production count, as well as a sales column that includes sales which include month to date (MTD), quarter to date (QTD), and year to date (YTD).

Figure 8:
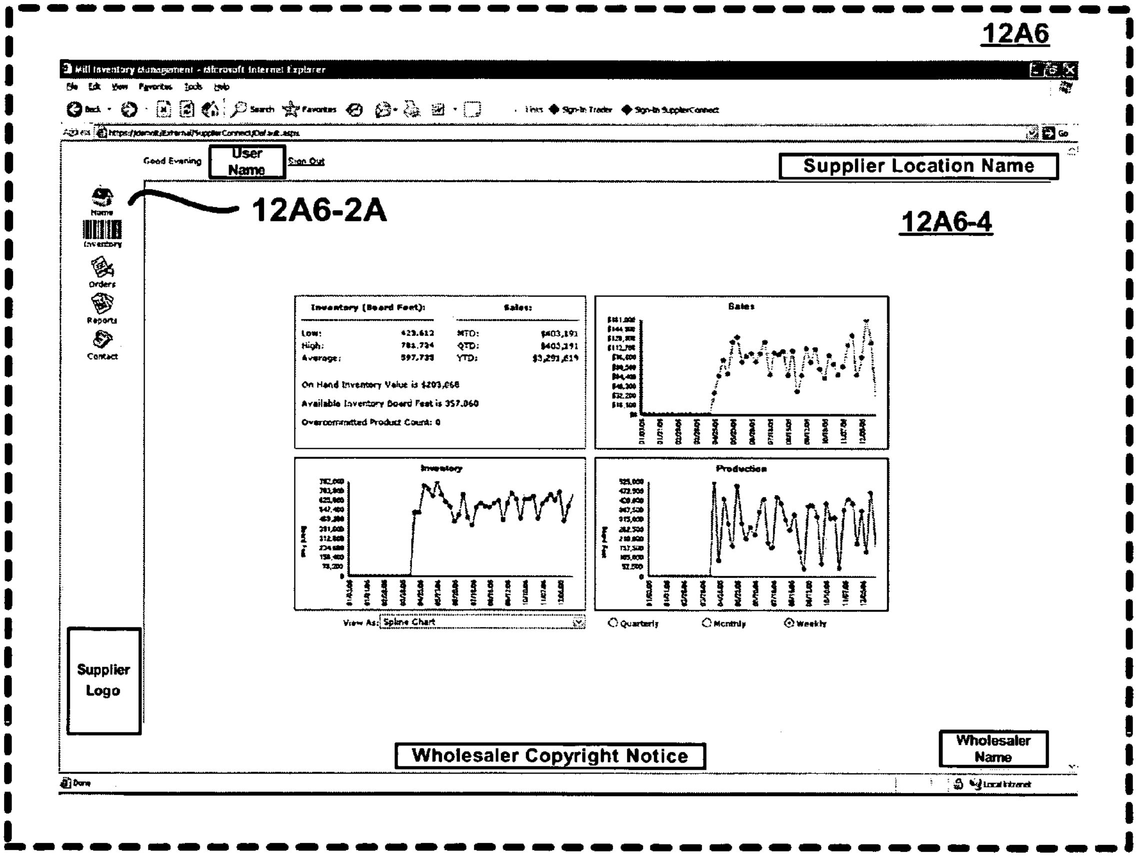

FIG. 8 is an alternate presentation of the screenshot of FIG. 9. Here, the graphical presentations are transformed from bar chart to line histogram. Preferably, for either the bar chart presentations of FIG. 9 or the line chart presentations in FIG. 10, the presentations may be modified by bi-weekly, monthly, or quarterly classifications.

FIG. 9 is a screenshot 12A6-6 of supplier inventory products when inventory icon 12A6-6C is engaged and a drop down menu of products with inventory is selected. As shown in FIG. 9, the products with inventory in this example include various kinds of lumber that are classified qualitatively and by feature attributes. The types of products include various kinds of lumber such as Ponderosa pine, surface condition (e.g., rough or surfaced), assorted lengths, widths, thickness and width dimensions, the available units that are in inventory, those units which have already been committed for sale, units which are available for sale, total units (at the bottom), the price per 1000 board feet or MBF, and the pieces per unit. As shown in FIG. 9, the particular mill and supplier in this example has the option to determine where a particular product class is being used by making either a keyboard or a mouse-pointer selection to generate reports useful for supplier 12 and the wholesaler 16, as will be described below. In alternate embodiments, voice-activated commands are utilized alone, or in combination with the other described modes of interaction.

FIG. 10 depicts a “Where Used” report. Here, by keyboard selection or mouse pointer selection, a Mill Product Where Used Report 12A6-8 is generated for a particular kind of Ponderosa pine product (here a rough cut in 8 to 16-foot lengths). As shown on screenshot 12A6-8, the tracking number and quantity in board feet (BF) is shown. This screenshot 12A6-8 shows the committed inventory for sale to the wholesaler 16. The Where Used report shows the orders where a particular product is designated. If a unit of lumber is committed to an order out to a customer but remains in inventory, it will show up in the Where Used report so user can find the order that contains the lumber.

Figure 13:
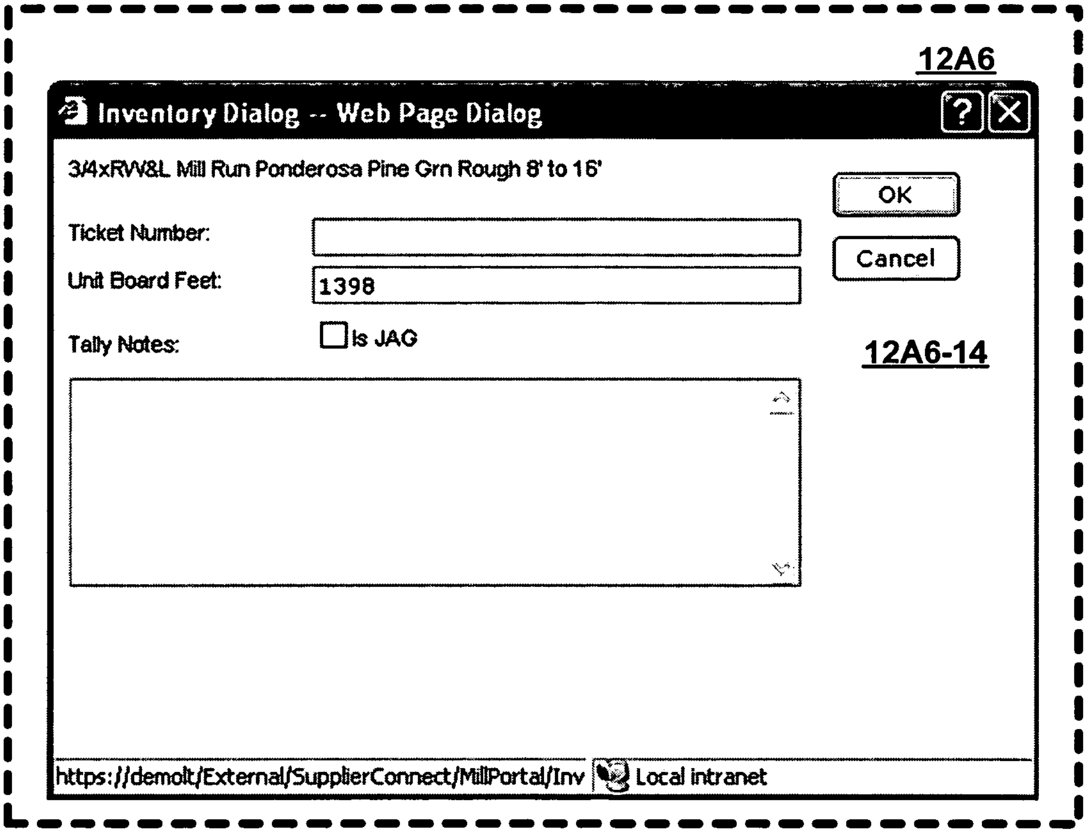

FIG. 11 depicts a web page dialog 12A6-10 of inventory details of product inventory units having a status of existing in “inventory” and associated with a given ticket number by the given ticket number’s creation date. Included in the webpage dialog 12A6-10 are several selectable buttons including add, modify, and delete for altering the information displayed in webpage dialog 12A6-10. As shown, the webpage dialog 12A6-10 includes ticket number, when the ticket number was created, its status, the amount of unit board feet, and whether or not it is a full load or a partial load. If it is a partial unit, the “Is Jag” boxes are checked or if it is a complete load, the “Is Jag” box remains unchecked. FIG. 13 also shows total number of units and total quantity (MBF) for selected product, at the bottom of the screen.

Figure 12:
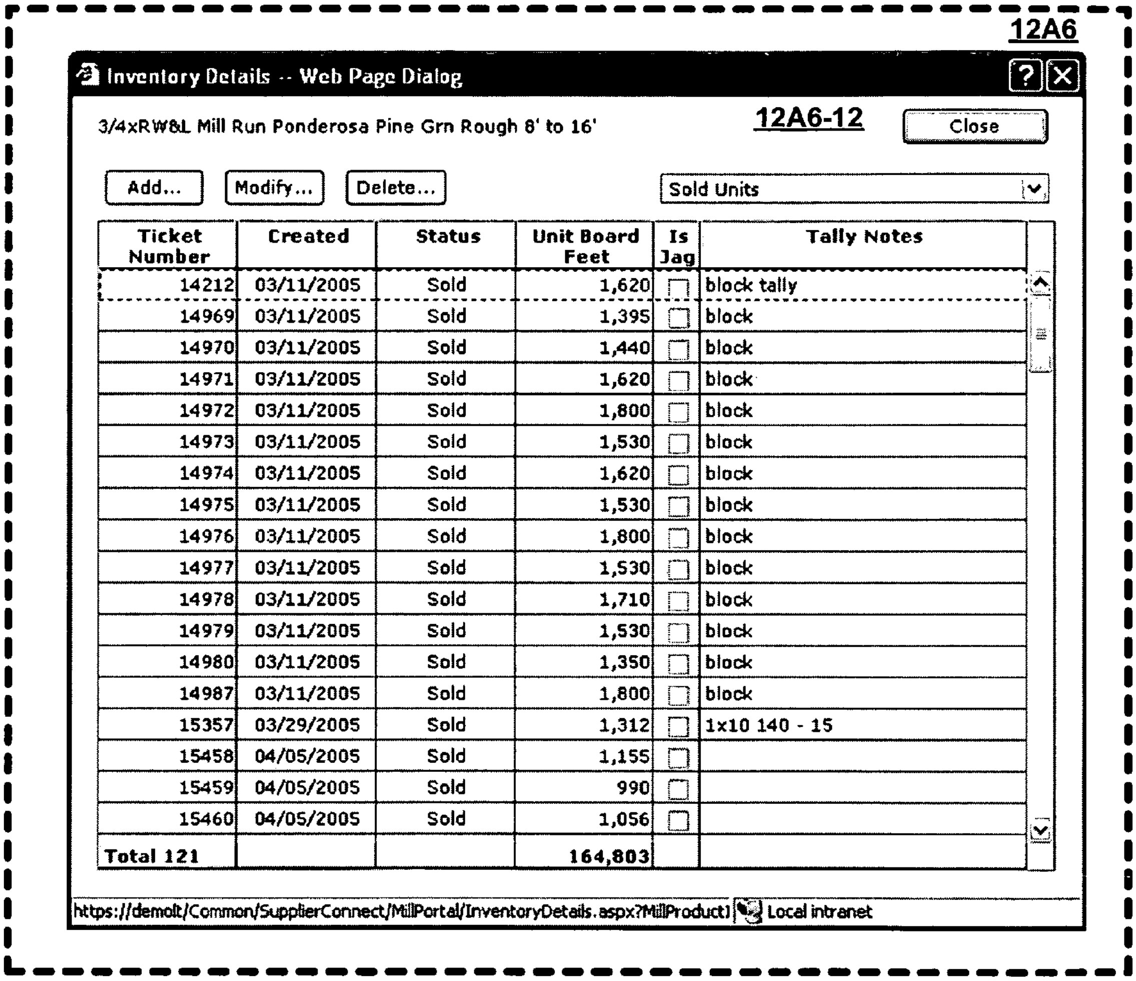
Figure 14:
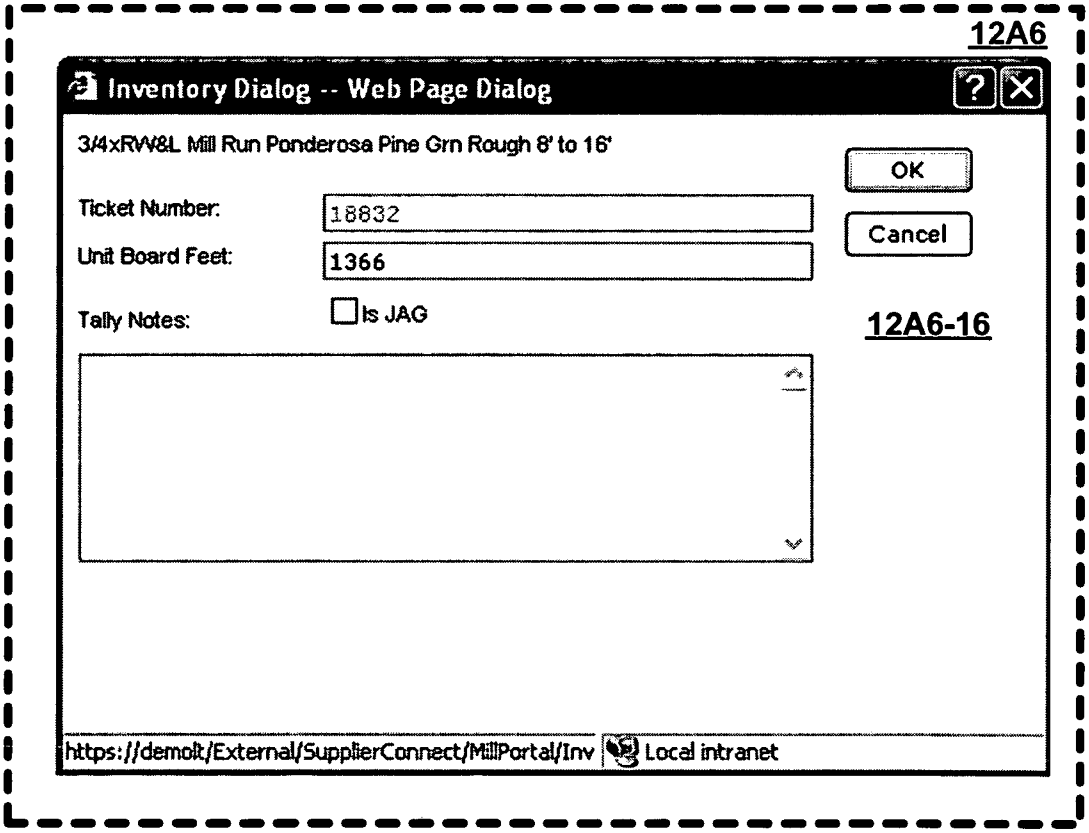

FIG. 12 depicts another web page dialog screenshot 12A6-12 of inventory details of product inventory units having a status being “sold” and associated with a given ticket number by the given ticket number’s creation date. Here, screenshot 12A6-12 includes a different set of ticket numbers, creation date, status of entries that have now changed from inventory to sold, the unit board feet, and the jag classification. FIG. 14 also shows total number of units and total quantity (MBF) for selected product, at the bottom of the screen.

FIG. 13 depicts initiation of a web page dialog screenshot 12A6-14 prepped to add an inventory number for a particular grade of Ponderosa Pine having a specified number of unit board feet in this example (1398 is a default value for this product —it can be more or less). As shown in screenshot 12A6-14, the specified minimum is 1398 unit board feet.

FIG. 14 shows FIG. 13 in use. Here in screenshot 12AC-16 ticket number 18832 is entered as is 1366 unit board feet for the particular grade of Ponderosa Pine.

Figure 15:
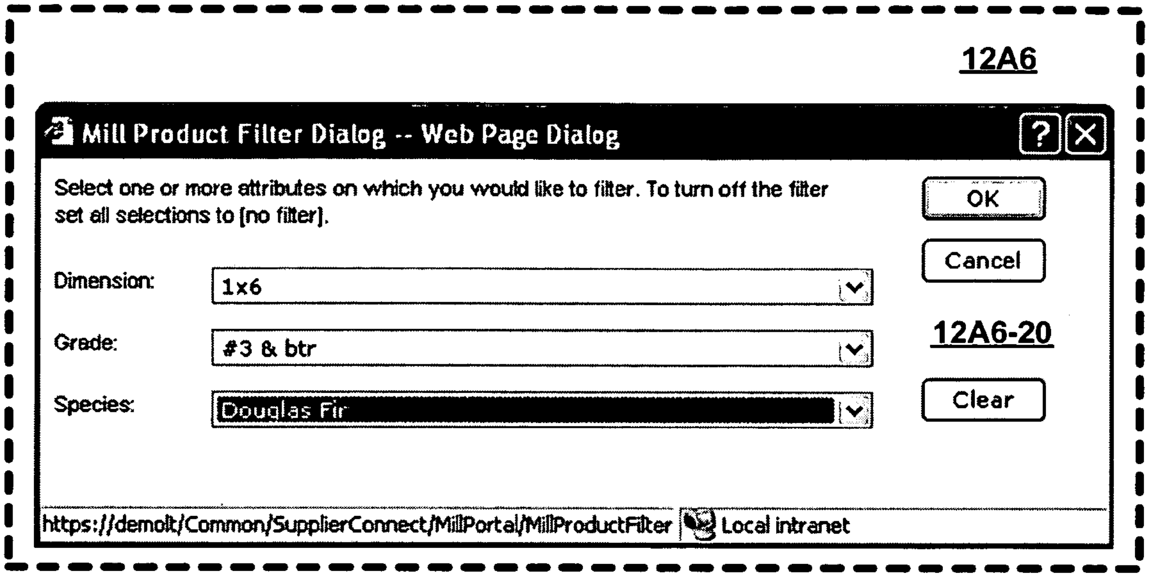
Figure 17:
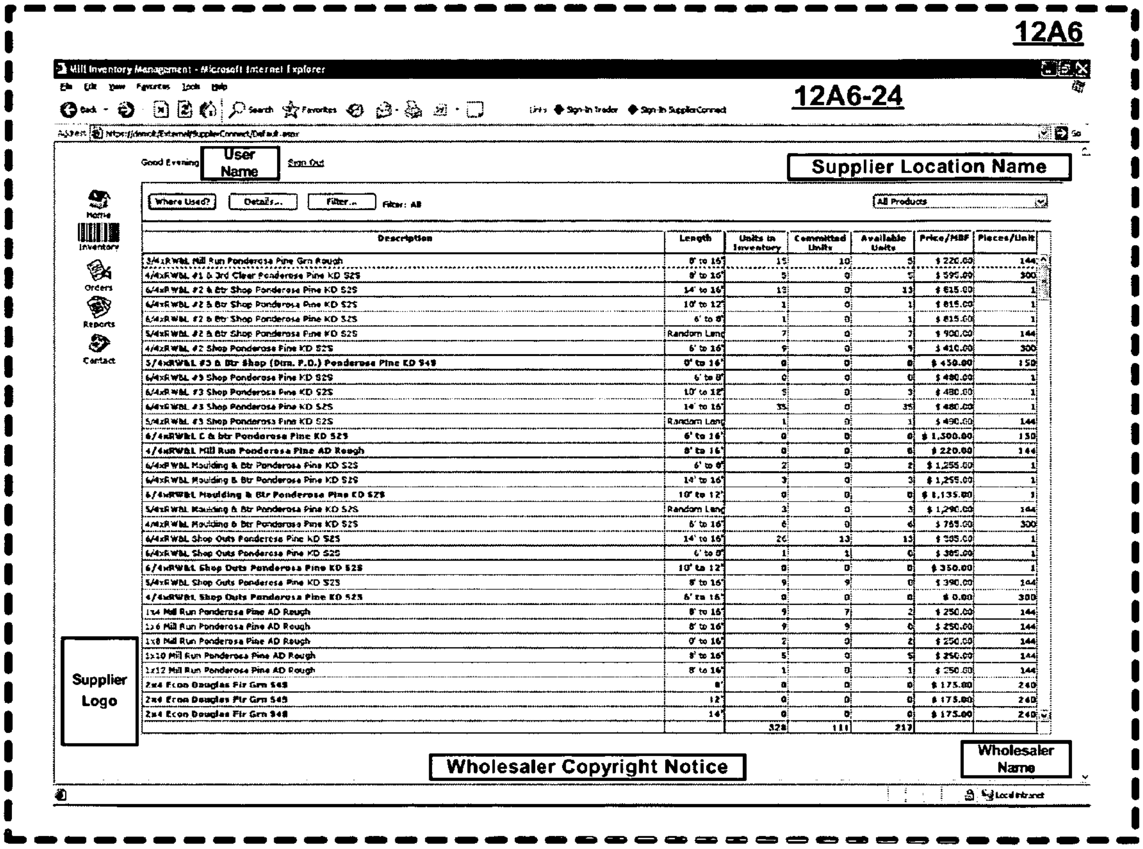

FIG. 15 depicts a Filter web page dialog in screenshot 12A6-20 to query the user about characteristics, attributes and/or properties of the inventory. In the example depicted, the attributes shown are Dimension, Grade and Species, but any number or kind of attributes could be used in alternate embodiments. As depicted in FIG. 15, an automatically generated product description of a particular kind of wood is shown in the screenshot 12A6-20 in the dimension box pull-down menu. The dimension pull-down menu is for a certain kind of board one-inch by six inches. In the grade box below the dimension box is a certain kind of grade (“no. 3 and btr”) rating. Beneath the grade box is a species box in which a particular kind of tree, for example, Douglas Fir is selected. In one embodiment, the drop-down choices are limited to a subset of the universe of inventory available from that supplier (e.g., as shown in a screen like that of FIG. 17). In this embodiment, the data presented in FIG. 17 is presented as a result of the operation of the taxonomy software engine described elsewhere in this application. Thus, the data in FIG. 17 already has ruled out illogical or impossible combinations.

In an alternate embodiment, the algorithmic process of eliminating illogical or impossible (or even improbable) combinations is performed in whole or in part by or at the Filter Dialog Box of FIG. 15 or its equivalent. Thus, while the depicted FIG. 15 has some fields that are hard-coded, in alternate embodiments, they may be dynamic. Dynamic embodiments could be implemented with the taxonomy engine described herein, or otherwise.

Figure 16:
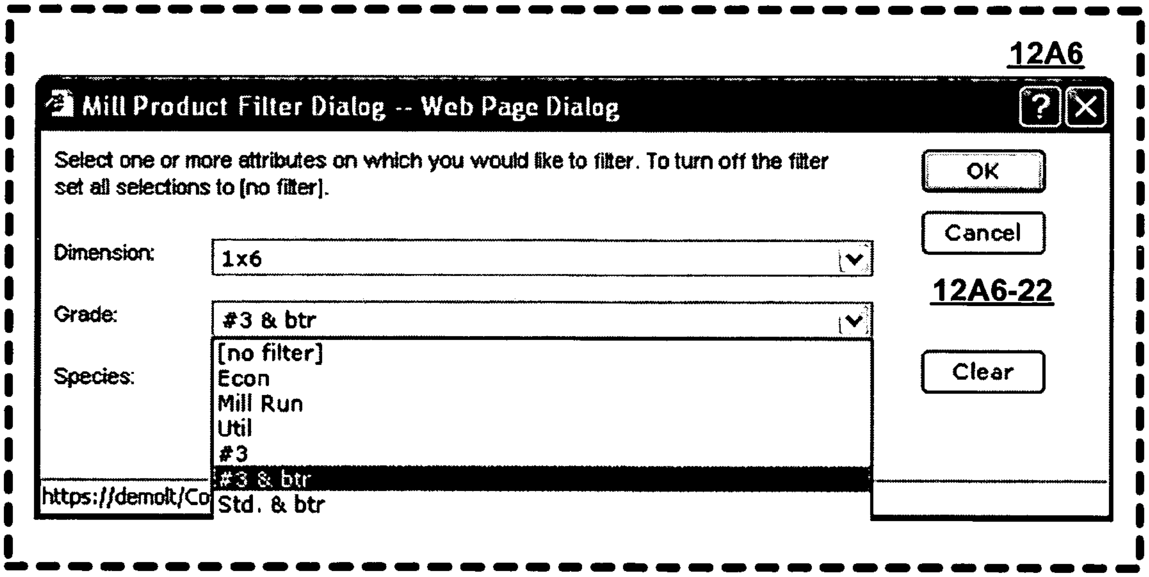

FIG. 16 depicts selection options of a web page dialog in screenshot 12A6-22 to search for and view inventory having a variety of definitions. Preferably, this Filter dialog box is used to restrict display to help users focus on a small range of products rather than looking at everything all at once. For example, if the user is only interested in viewing 2×4 inventory, the filter dialog is a convenient tool to restrict the display of inventory to only those items. Again, as explained above, in some embodiments the choices presented are hard coded, and in others, they are dynamic, based on the taxonomy engine or otherwise.

FIG. 17 is a screenshot 12A6-24 depicting an excerpt of all products when "All Products" drop down menu and the "Inventory" icon are engaged by keyboard or mouse pointer. In screenshot 12A6-24, the various classified products are classified by physical attributes links, the amount of units in inventory, the amount of committed units already sold, the billable units available for sale, the price per thousand board feet (MBF), and the number of pieces per unit (this is the same user interface shown in FIG. 11, but differs in that "All Products" has been selected, rather than the subset "Products with Inventory" selected by FIG. 11. The data in both can be supplied in whole or in part from the code located elsewhere within this application, or otherwise, as described, in either instance, or both).

Note that the data presented in FIG. 17 (or the drop down menu choices for filtering in FIG. 15 or 16, or indeed many of the previous or subsequent screenshots) can be supplied in various ways. The classifications may be supplied in whole or in part manually, or automatically from a static database or lookup table, or from Internet-based searches to relevant dynamic databases or relevant information sources that are now, or may eventually, become available.

Alternatively and preferably, the classifications are generated dynamically and by use of program instructions executed by a taxonomy engine, developed and operating at least in part based on inherent or customary characteristics of the products in question. Preferably, these inventory characteristics, attributes and/or properties form the basis for specific taxonomical definition generated by the taxonomy engine, which in turn renders the user interface presented to the supplier much simpler to use. For example, it will automatically restrict the range of possible combinations or choices to those that actually exist, or satisfy any other desired criteria. For example, the taxonomy engine will ensure that items of inventory are sold and priced only according to industry standard units of measure.

These product definitions generated by a taxonomy engine may be presented (or generated in part) via a filter or other interface whereby the attributes are selected and ordered by class, subclass, sub-subclass, genus-species, and multiple other classifications. The classifications may be qualitative as, for example, different kinds of durable goods, or by physical attributes for a given durable good. The taxonomical definitions and classifications may also include the available inventory described in certain quantitative terms which would occur in lumber for certain kinds of dimensions and various levels of moisture content or a specific product grade (e.g., frequency of knots in the wood). In an alternate embodiment, a filter dialog tool is offered to generate a list of products by specific combinations of attributes as defined for those products by a taxonomy. Again, not necessarily, but preferably, these definitions of products are generated dynamically and by use of relational databases and program instructions. An example of such program instructions which may be used to generate such classifications and product definitions is set forth at the end of this application.

Figure 18:
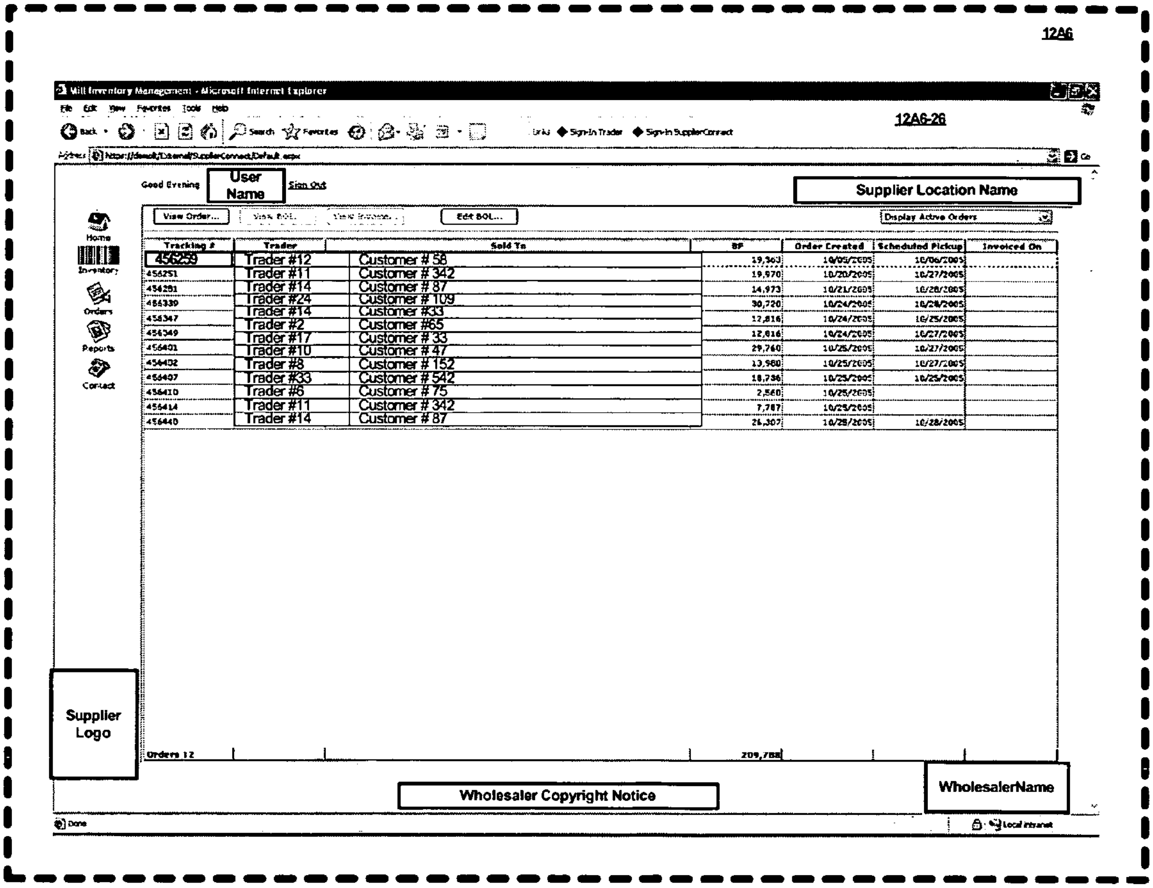

FIG. 18 is a screenshot 12A6-26 depicting current orders when the "Display Active Orders" of the drop down menu is selected and the "Order" icon is engaged. As shown in screenshot 12A6-26, a column of tracking numbers is listed along with names of traders and the customers sold to, the board feet that was sold, the dates when the orders were created, and the dates on which pick-up is scheduled. Alternate embodiments include PONow™ and/or SupplierConnect™ technologies' ability to automatically create and transmit mill invoices upon creation of a bill of lading. In other words, in this embodiment, once the truck or train has been actually loaded, the supplier may create a bill of lading listing the exact goods and quantity loaded for delivery. (In many industries, the exact amount delivered may occasionally vary from the amount originally ordered.) Once this bill of lading is created in this embodiment (pursuant to interfaces described herein), then an invoice is automatically generated, transmitted to the wholesaler 16's view, and available for processing for payment to the supplier 12. This feature is particularly advantageous in that suppliers currently have the burden of creating their own invoices, bills of lading (BOL) and order confirmations, and faxing or mailing them to the wholesaler 16 for payment, or carrier for shipment, as appropriate. This is costly and inefficient. In contrast, a supplier employing certain embodiments of PONow™ and/or SupplierConnect™ technologies essentially automatically generates a bill of lading, not only for printing for the carrier, but also to create documents for on-line connected suppliers 12 that in turn triggers payment by wholesaler 16 to the on-line or off-line suppliers 12.

Figure 18A:
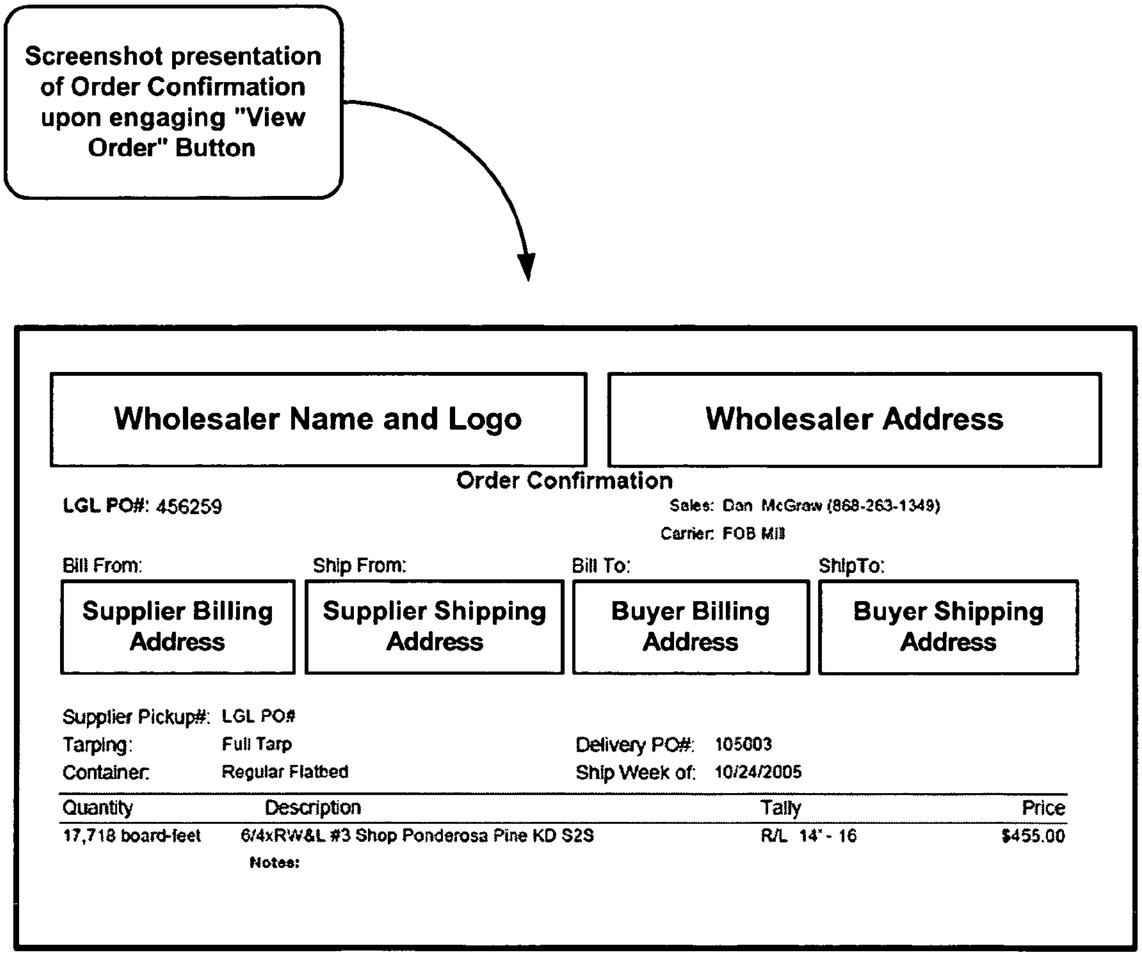
Figure 18B:
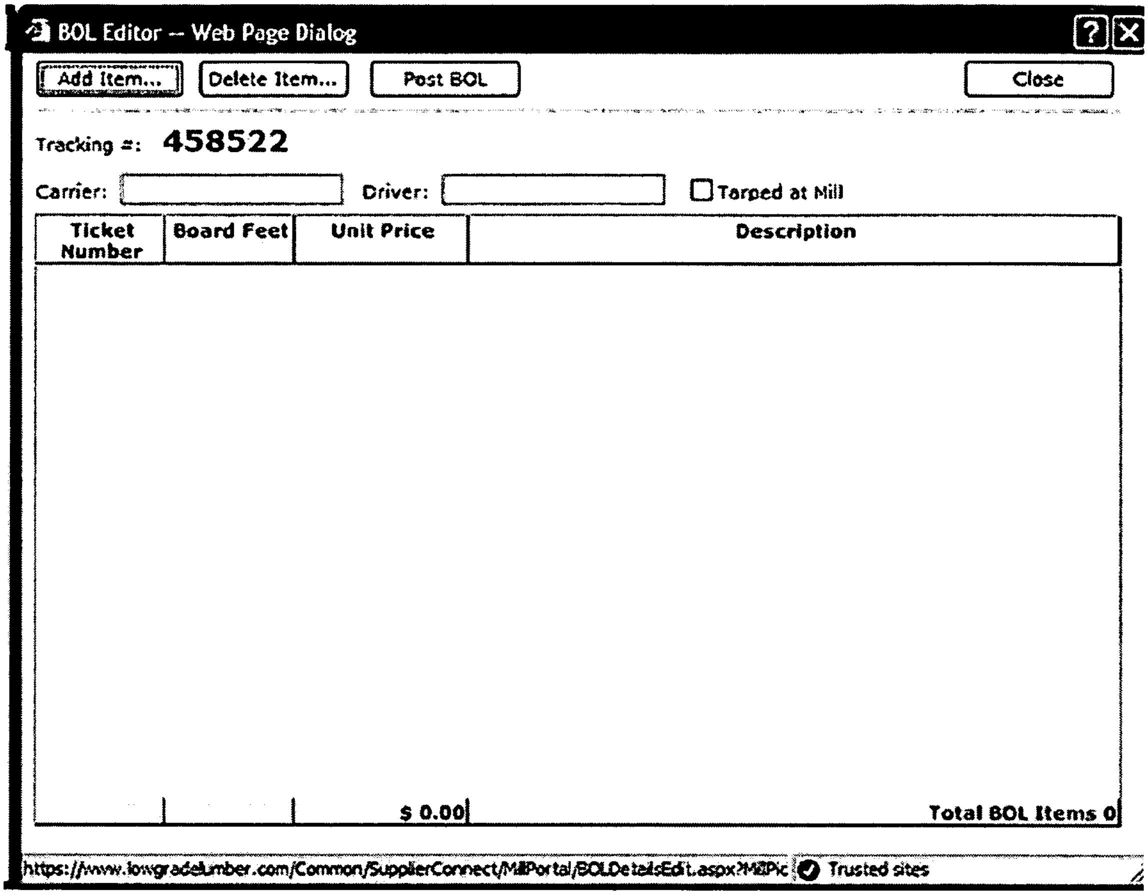

For example, in FIG. 18, at button "EDIT BOL", the supplier uses the interface to create a BOL. The system then generates an invoice and BOL automatically and it is sent on the buyer's behalf. FIG. 18A is an Orders Confirmation screenshot that appears upon engaging the "View Order" button of the screenshot of FIG. 18. As shown approximately 18,000 board-feet of the indicated lumber description to be sent (or in some embodiments was already sent) to a buyer from the supplier for $455/MBF. Thus, in FIG. 18B, the dialogue allows the supplier to enter a ticket numbers for the load on the truck (or other carrier) and click "POST BOL." At that point, the system automatically checks to ensure consistency with the original order. If consistent (within acceptable tolerances), the system then automatically generates a BOL (see FIG. 18C), creates and sends an invoice (see FIG. 18D), the invoice is received by the wholesaler, who then initiates the payment process. FIG. 18E shows a posted BOL, reflecting previous edits. FIG. 18C is a Bill of Lading document that appears upon engaging the "View BOL" button of the screenshot of FIG. 18 after an order has shipped. As shown approximately 18000 board-feet of the indicated lumber description was loaded from the supplier by a trucking company. This would be the paper that the trucker would take with the load. FIG. 18D is an Invoice document that appears upon engaging the "View Invoice" button of the screenshot of FIG. 18 after an order has shipped. As shown approximately a charge of approximately $8,000 for 18,000 board-feet of the indicated lumber description at $455/MBF is stated on the invoice. FIG. 18E is a BOL listing screenshot that is an alternate presentation of goods that have shipped, and appears upon engaging the (in this context somewhat misnamed) "Edit BOL" button of the screenshot of FIG. 18. As shown ten ticket numbers are on the BOL.

Figure 19:
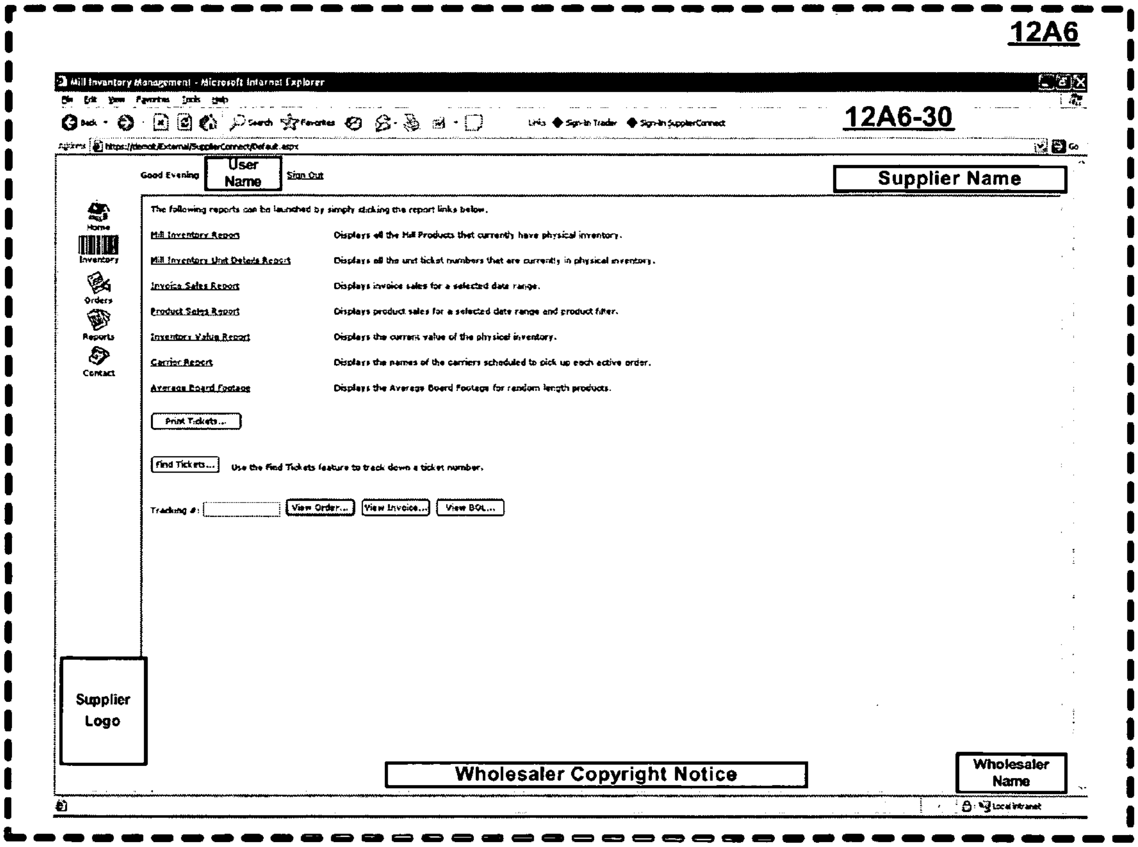

FIG. 19 is a screenshot 12A6-30 of a report links list when the "Report" icon is engaged. As shown in screenshot 12A6-30, seven report types are underlined indicating that they are hot links such that an appropriate report will present itself as a webpage when a link is selected by keyboard or mouse pointer. The seven hot links include mill inventory report, mill inventory unit details report, invoice sales report, product sales report, inventor's diary report, area report, and average board footage. The mill inventory report displays all the mill products that currently have physical inventory, that is inventory that is available for either shipping or selling. The mill inventory unit details report displays all the unit ticket numbers that are currently in physical inventory. The invoice sales report displays invoiced sales for a selected date range. The product sales report link displays product sales for a selected date range and product filter. In this case, the product filter preferably (but not necessarily) uses the results of the taxonomical classification system software application described herein. Alternatively, the inventory information and data is supplied from alternate sources. The inventory value report link once engaged displays the current value of the physical inventory. The carrier report link displays the names of the carriers, such as truckers or railroad delivery or ship delivery personnel, to pick up each active order. The average board footage link displays the average board footage for random lengths products. The buttons shown on screenshot 12A6-30 beneath the average board footage link are a print ticket button and a find ticket button. Selection of the find ticket button causes the find ticket feature to track down a particular unit ticket number. Beneath the find ticket button is a tracking number box to receive alphanumeric information, a view order button, a view invoice button, and a view bill of lading so that a carrier may see a delivery manifest, and/or print out the BOL to give to the carrier.

FIG. 20 is a screenshot 12A6-32 that is presented upon engaging the "Mill Inventory Report" link of FIG. 19. Shown in screenshot 12A6-32 is the date of the report, a column listing ticket numbers for a particular taxonomical class of Ponderosa Pine in various dimensions, a board feet column, and the date the ticket order was added. In one embodiment, this report and screen uses data generated by the taxonomy engine described at the end of this application.

FIG. 21 is another alternate screenshot 12A6-36 that is presented upon engaging the "Average Board Footage Report" link of FIG. 19. Here, a representation of the taxonomical product listing of FIG. 21 is described in terms of average board feet for all random length products, or any other products. In one embodiment, this report and screen uses data generated by the taxonomy engine described at the end of this application.

Figure 22:
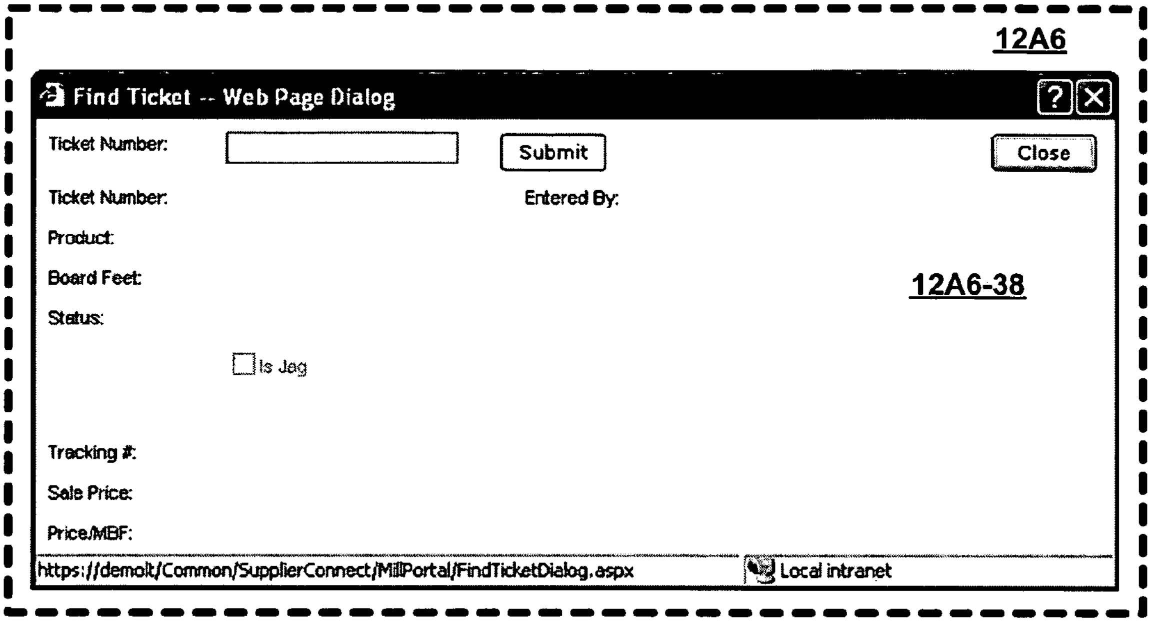

FIG. 22 is a Web Page Dialog screenshot 12A6-36 which comes into view of the wholesaler 16 or supplier 12 whenever the find ticket button of screenshot 12A6-30 of FIG. 21 is engaged. Here, the supplier 12 or wholesaler 16 may type in a ticket number in the ticket number box and engage the submit button to acquire taxonomical and transactional information associated with a particular ticket number. In one embodiment, this report and screen uses data generated by the taxonomy engine described at the end of this application.

Figure 23:
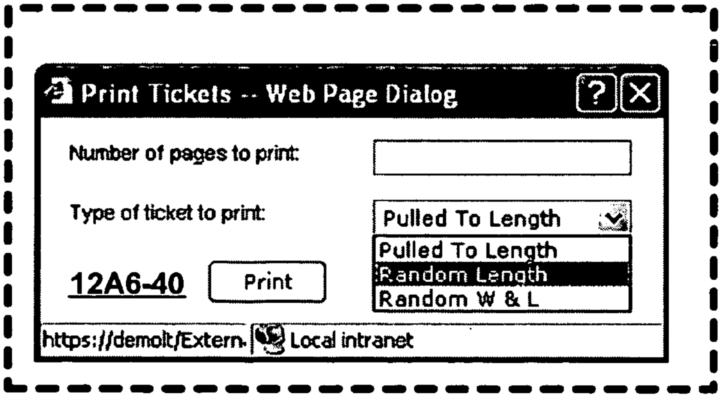

FIG. 23 is Web Page Dialog screenshot 12A6-40 that is invoked when the print ticket button of screenshot 12A6-30 of FIG. 21 is engaged. As shown in screenshot 12A6-40, several options are presented in a type-of-ticket-to-print drop down menu including, for example, Pulled to Length, Random Length, and Random W & L, or Random Width and Length. In some embodiments, typing in a number greater than zero here and hitting submit will return a formatted sheet of barcoded unit tickets that can be printed on perforated paper and used to label and track individual units (an inventory group; several sticks of lumber banded together).

Figure 24:
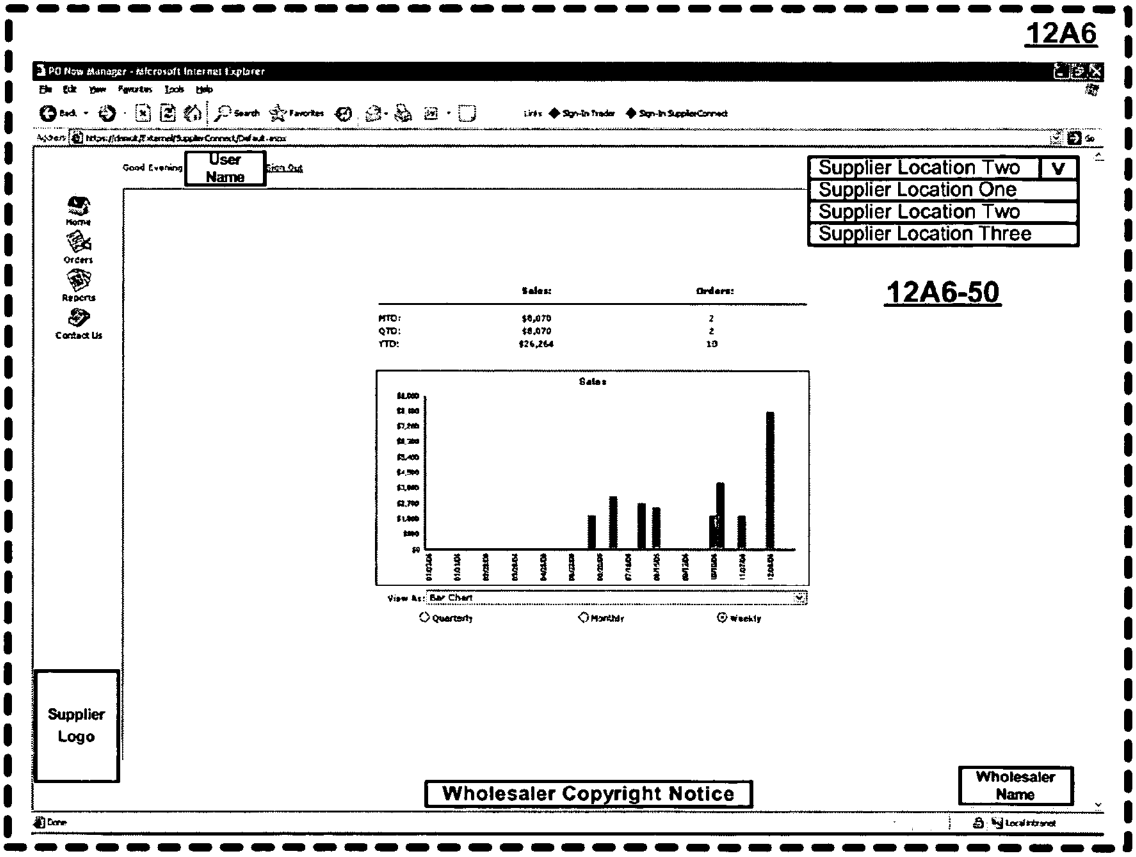

FIGS. 24-29 depict a series of PONow™ screenshot examples of the tools described above and visible between supplier (seller) and wholesaler (buyer). FIG. 24 depicts a home screenshot 12A6-50 having graphic and alphanumeric data of the product inventory available for the supplier 12 to initiate a purchase order with the wholesaler 16. As shown in screenshot 12A6-50, a column graphic is shown for sales in addition to the number of orders and associated sales for month to date (MTD), quarter to date (QTD), and year to date (YTD). The Home screenshot 12A6-50 includes the Home icon 12A6-50A, the Order icon 12A6-50C, the Reports icon 12A6-50E, and the Contact Us icon 12A6-50J. In addition, the screenshot 12A6-50 also presents a dialogue box of suppliers enabling the wholesaler 16 to review the supplier-initiated purchase order that has been submitted to the wholesaler 16.

Figure 25:
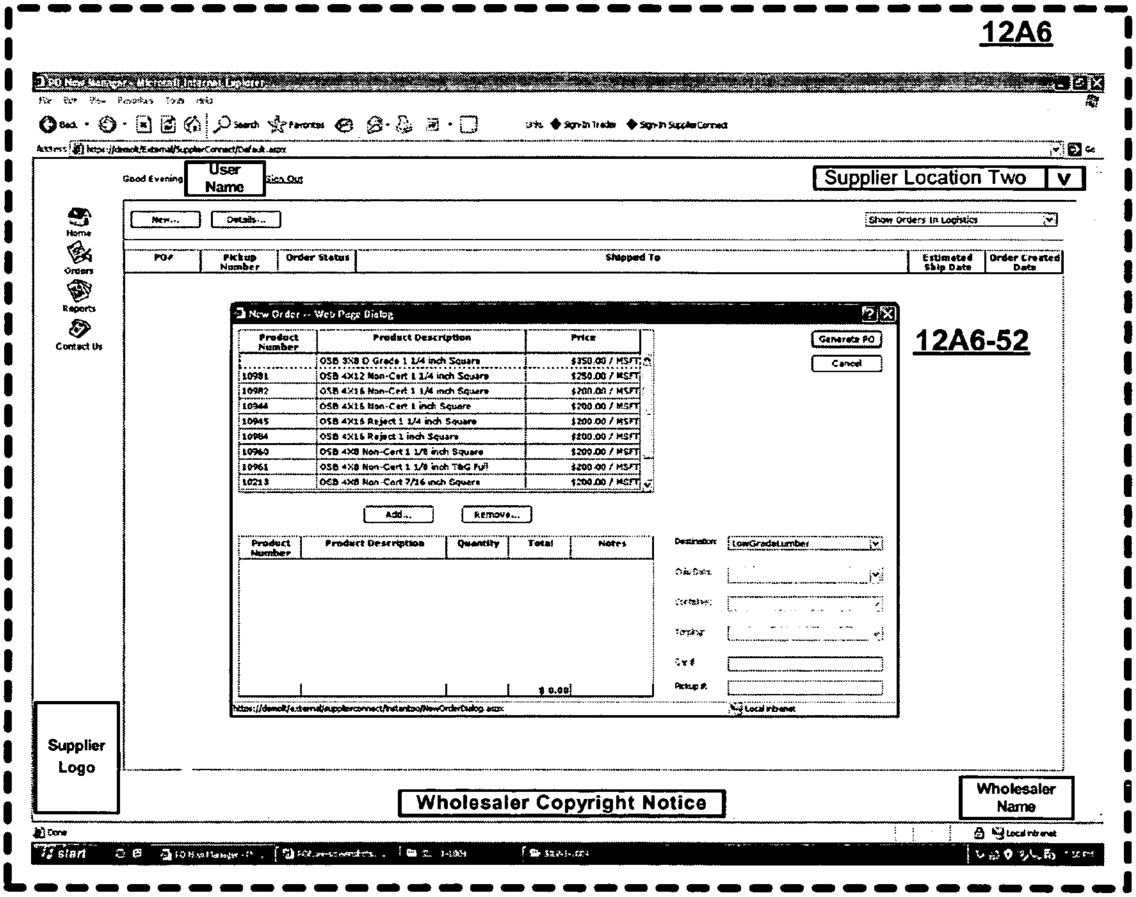

FIG. 25 is a new purchase order initiation screenshot 12A6-52 that is presented when order icon 12A6-50C is engaged and the drop down menu 12A6-50M has been selected for a particular supplier. Here, the new order includes a list of product numbers, product descriptions (or definitions preferably but not necessarily generated by a taxonomy engine, such as described elsewhere in this application), and a price per unit classification. An ultimate destination buyer may be shown in the destination box. Again, in the preferred embodiment, the supplier here is initiating the purchase, in a sense on the buyer's behalf, and in fact creating the PO for the buyer. Preferably, this is pursuant to a previously arranged contract, so that there is no need for negotiation over any terms, nor even any paperwork, thereby enhancing convenience to the seller, and reducing overall transaction costs.

Figure 26:
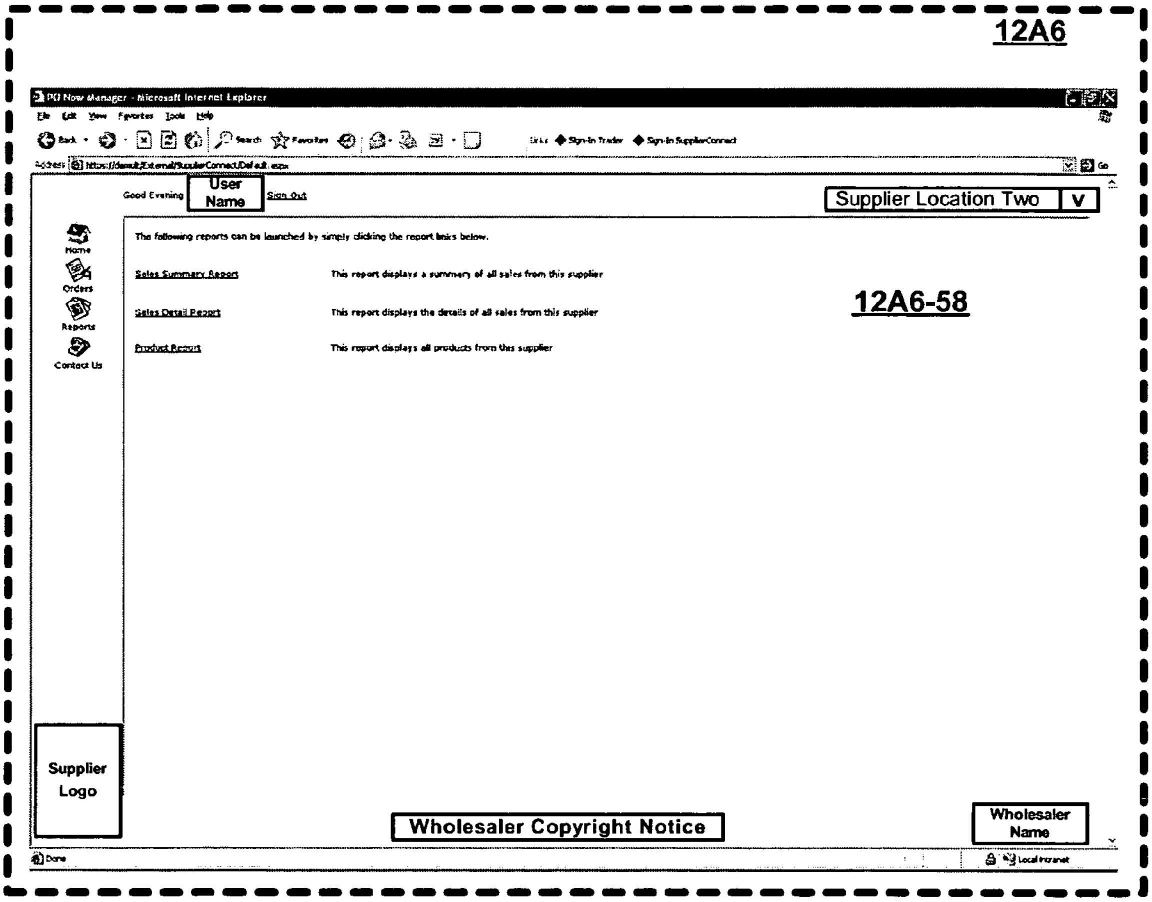

FIG. 26 is a screenshot 12A6-58 that presents itself where a particular supplier is selected in the supplier pull-down menu 12A6-50M and the Reports icon 12A6-50E is engaged. The screenshot 12A6-58 presents a report link list for the supplier initiated purchase order with the wholesaler 12. There are three linkable reports including Sales Summary Report, Sales Detail Report, and Product Report. When the Sales Summary Report is engaged by keyboard selection or mouse pointer processes or otherwise, the Sales Summary Report link presents a report that displays a summary of all the sales from the particular supplier that was selected in the pull-down menu. The Sales Detail Report, upon hot link activation, will present display of the details of all the sales from the supplier, and the Product Report, once activated will present a webpage that displays the product listing from the supplier.

FIG. 27 is a product report screenshot 12A6-60 that is presented upon pressing the hot links Product Report of screenshot 12A6-58 of FIG. 28. The screenshot 12A6-60 displays a Product Number listing, Product Description, and Price per thousand square feet. In one embodiment, using for example PONow™, the supplier can relate the supplier's own SKU numbers to PONow™'s precise multi-attribute description of the product. (Derived, as mentioned above, from a taxonomy engine such as described elsewhere in this application, or otherwise). One benefit of this feature is that they supplier can use their own nomenclature, without needing to adapt to any other. This facilitates, in effect, a common inventory language (or translation between languages) among buyer and seller that also helps to reduce transaction costs.

(For example, Supplier X does not think in terms of selling "4×8 Non-Cert ½" Square OSB" or wholesalers' unfamiliar product code {ZNP XSQ RSS BLM}, they think instead intuitively of selling their own "product 24601".)

FIG. 28 presents a screenshot 12A6-62 of a buyer order confirmation. In the Order Confirmation, the purchase order number is listed, the traders, the supplier address, the buyer's address, and the Quantity, Description, Tally, and Price of the purchase order initiated by the supplier 12 to the wholesaler 16, or in some embodiments, the converse.

FIG. 29 presents a screenshot 12A6-66 that depicts an Active Order Carrier Report. Screenshot 12A6-56 lists a Supplier Two's products, the tracking numbers for the products, and a Carrier column having a listing of carrier numbers associated with the tracking numbers, and picking updates either scheduled, to be scheduled, or historic. For example, tracking number 455332, a carrier has not been booked yet, but a pickup date of Oct. 6, 2005 is indicated. In another example is tracking number 456251, carrier #18 has been committed for a pickup date of Oct. 27, 2005. In a preferred embodiment of PONow™ and SupplierConnect™, this feature is in actual real time, actual information, and, in operation, automatically contractually commits the carrier to pick up and deliver the specified load according to pre-arranged terms. Again, this feature or aspect of the system increases convenience and reduces transaction costs for the seller.

Figure 30:
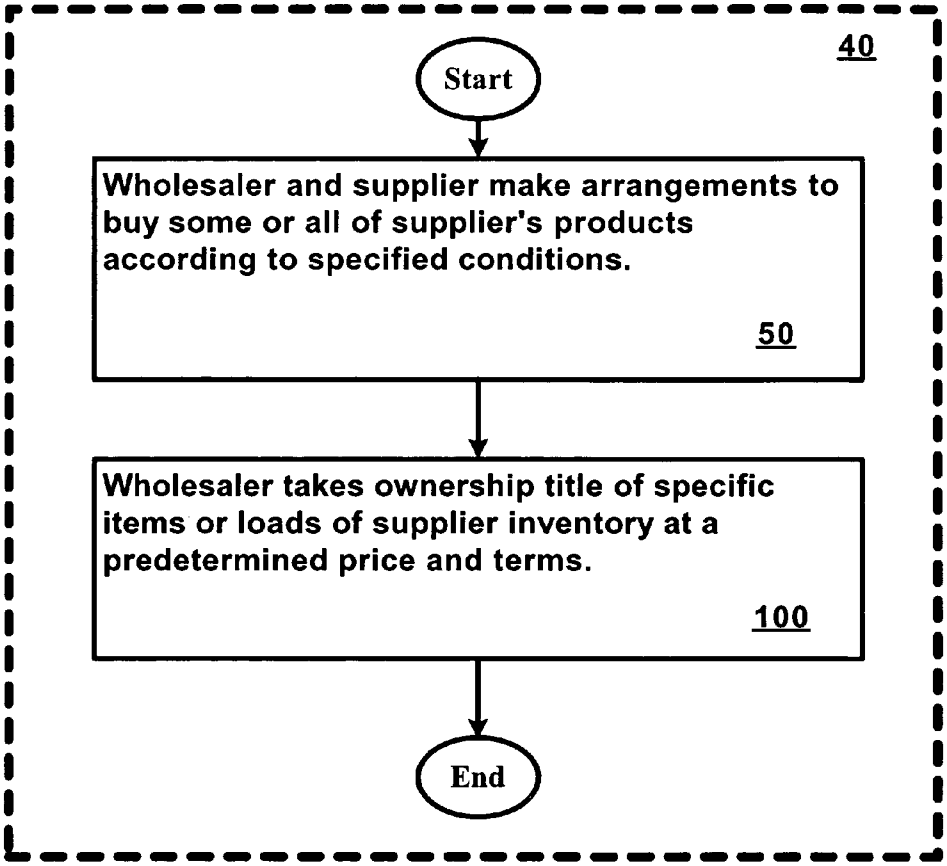
FIG. 30 is a block method flowchart depicting an overview of business process or context in which many of the embodiments herein operate.

FIG. 30 is a block method 40 flowchart of a portion of the system. The method 40 is illustrated as a set of operations shown as discrete blocks. In an embodiment, the method 40 may be implemented in any suitable hardware, software, firmware, or combination thereof. The order in which the operations are described is not to be necessarily construed as a limitation. The method 40 begins with sub-algorithm block 50 where the wholesaler 16 and the supplier 12 make arrangements to purchase all, or a selected range, of the supplier's products, indefinitely, or for a set period of time. These arrangements preferably include agreeing to all contractual terms (e.g., price, goods, quantity, etc.), and installation and configuration of all software and/or hardware and/or other systems (including, without limitation, as described above) to facilitate efficient communication and transactions with minimal effort thereafter. Thereafter, all specific individual transactions are governed according to those terms, and thus the nodes in the diagram of FIG. 32 to follow, are with reference to specific individual transactions (unless otherwise specified).

At sub-algorithm 100, the wholesaler 16, takes ownership (i.e., title) of items of the supplier's inventory at a pre-determined price. Downstream buyers may (or may not) have already committed to the wholesaler to purchase the wholesaler-owned, but supplier-possessed product inventory. Fulfilling transactions may and preferably does include the wholesaler completing transactions with a downstream buyer (preferably also pursuant to similar efficiency-enhancing pre-arranged terms) as well as delivery.

Figure 31:
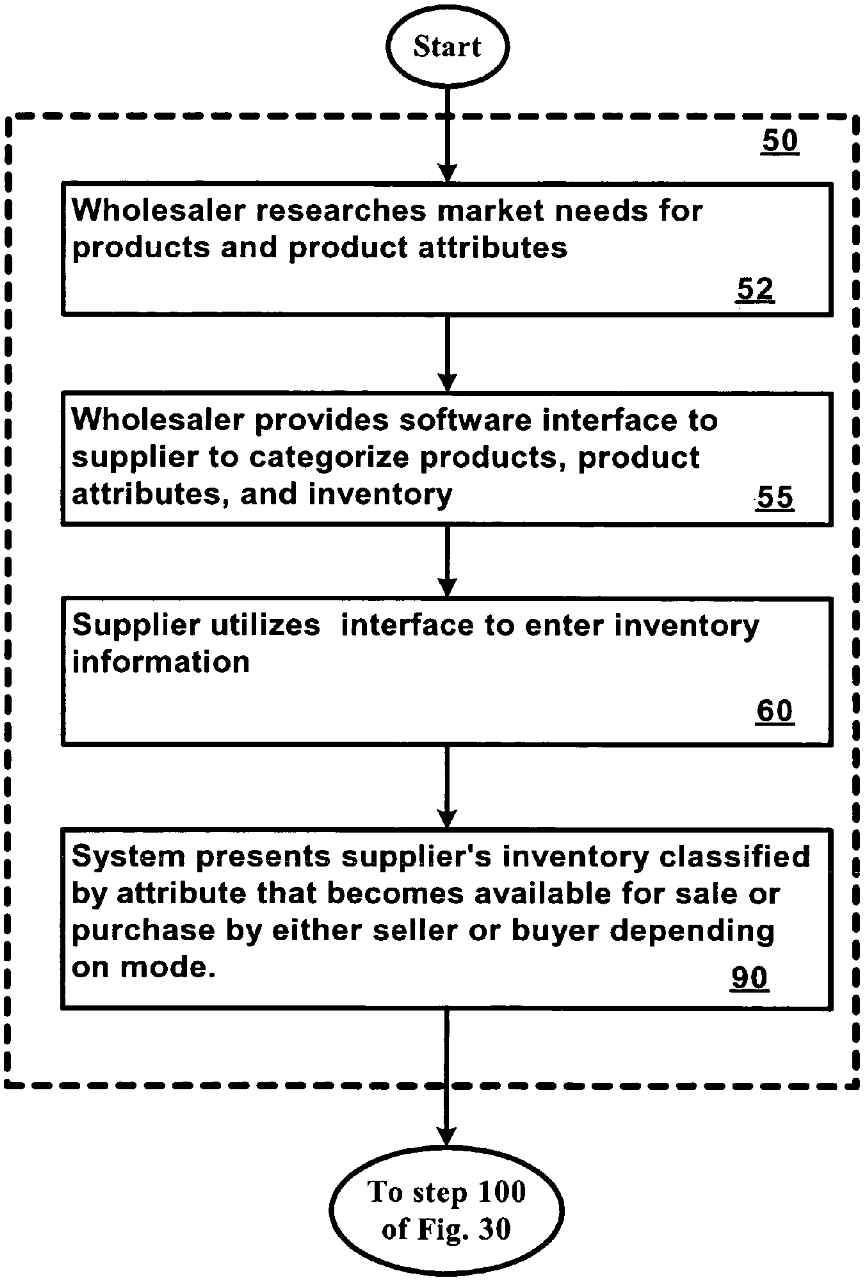
FIG. 31 is an expansion of step 50 of the process of FIG. 30.

FIG. 31 is an expansion of sub-step 50 of the method of FIG. 30. Process 50 begins when wholesaler 16 researches products to be bought and sold and their inherent or customary or other attributes at step 52.

At step 55, Once the products and attributes are identified, the wholesaler 16 then provides, based on those products and attributes, an interface and information to the supplier that enables the supplier to efficiently provide information regarding (and in some embodiments also more efficiently manage) its inventory. The information presented to the supplier in the user interface is preferably customized to be as relevant, intelligent and efficient as possible, based on all relevant variables (e.g., the exact product, and each product's attributes, the supplier, location, etc.). For example, products that are only made and sold in certain dimensions will be presented to the supplier with windows or choices only for those dimensions. (For example, OSB will be sold by sheets of certain dimension, rather than by the pound). The user interface may present categories that are hierarchal by qualitative characteristics of the particular durable goods offered by the supplier, the physical attributes associated with the particular durable goods offered by the supplier, along with the enumerated quantities available from the supplier 12. As mentioned above, the data presented to the supplier can be generated merely from static sources, entered manually, or hard-coded. Preferably however, the data and interface will be generated dynamically by program instructions, such as those described elsewhere in this application.

Once the wholesaler provides the user interface, in step 60, the supplier uses the interface provided by the system described herein to enter information about its own inventory, and thereby automatically classifies the product by attributes or definitions provided by the wholesaler 16.

Then, at step 90, the supplier's inventory is presented to, or available for viewing by, the buyer, according to the taxonomically derived or generated product definitions, and preferably subject to previously agreed terms, to enable purchase transactions according to either the PONow™ ("push") or the SupplierConnect™ ("pull") modes, or both. Thereafter, substep 50 proceeds to sub-steps 100.

Figure 32:
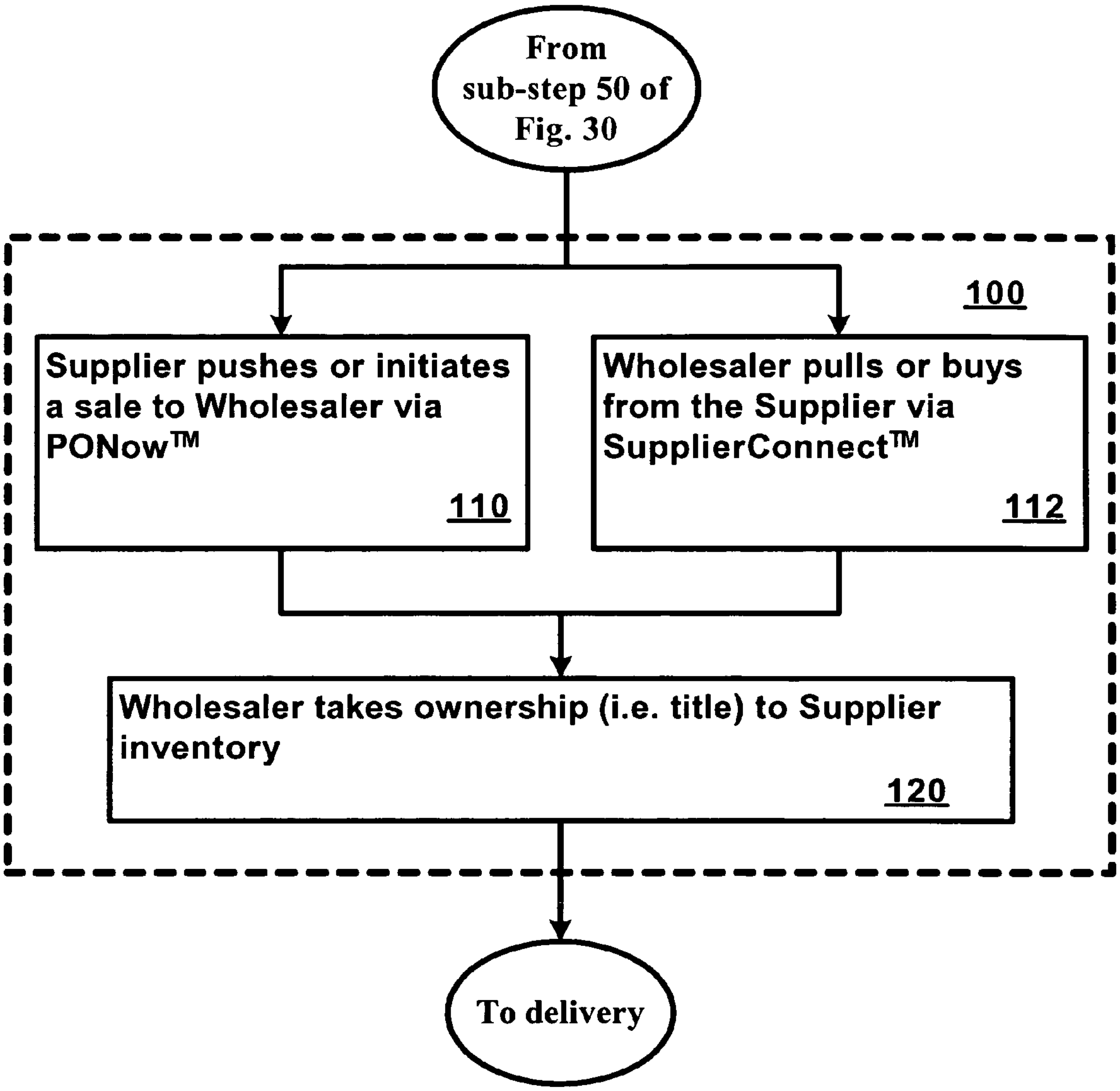
FIG. 32 is an expansion of step 100 of the process of FIG. 30.

FIG. 32 is expansion of sub-step 100 of the method of FIG. 30. Step 100 begins with the sub-step 110 wherein the seller decides to sell to the wholesaler ("push" or PONow™, akin to exercise of a put option), or alternatively, in sub-step 112 the wholesaler decides to buy from the supplier (the "pull" or SupplierConnect™, akin to exercise of a call option). Use of, or access to, SupplierConnect™ provided to the supplier 12 correspondingly imparts to the wholesaler 16 access to the supplier's inventory so the wholesaler 16 can re-sell supplier's inventory for the benefit of the wholesaler 16. To do this efficiently the SupplierConnect™ technology allows the wholesaler 16 to automatically purchase product out of the supplier 12's system and into the wholesaler's 16 system. In PONow™ the wholesaler 16 offers to the supplier 12 a commitment to buy all, substantially all, or agreed upon portions of supplier's 12 products at predetermined prices. The commitment of obligating the wholesaler 16 to efficiently acquire supplier's 12 product inventory is accomplished by pushing a PONow™ into the wholesaler's 16 system. In both cases the wholesaler 16 provides PONow™ and SupplierConnect™ as online tools that allows supplier 12 to view and effect the order transactions online. In both cases, each particular individual transaction is executed according to globally applicable terms previously arranged at block 50 of FIG. 30 as previously described.

Thereafter, at step 120, the wholesaler takes ownership (title) to the supplier inventory that has been entered into the system by or for the supplier, thus classified, and made available to the wholesaler for immediate and efficient purchase. Screenshots of a user interface, at least on the SupplierConnect™ mode, have been previously described above. See, for example, FIGS. 7-23.

Figure 34:
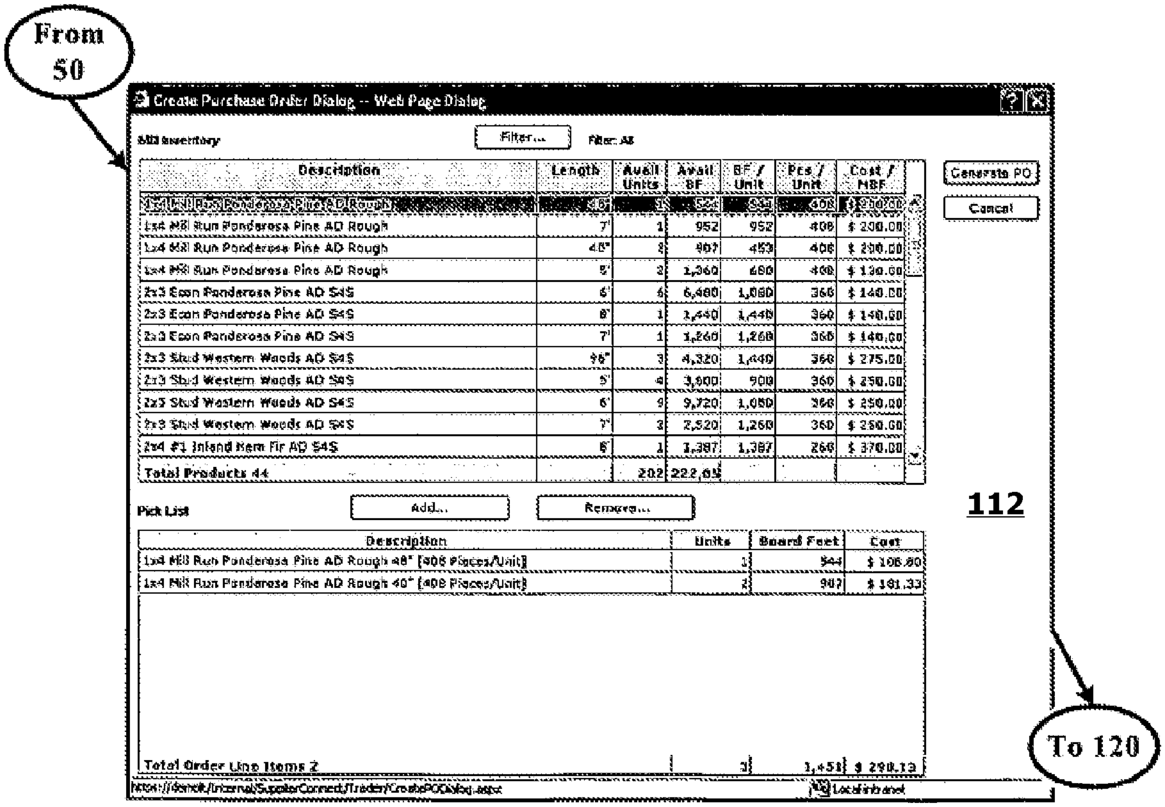

FIGS. 33-34 illustrate screenshots for implementing step 110 and alternate step 112 of sub-process 100 of FIG. 32.

Figure 35:
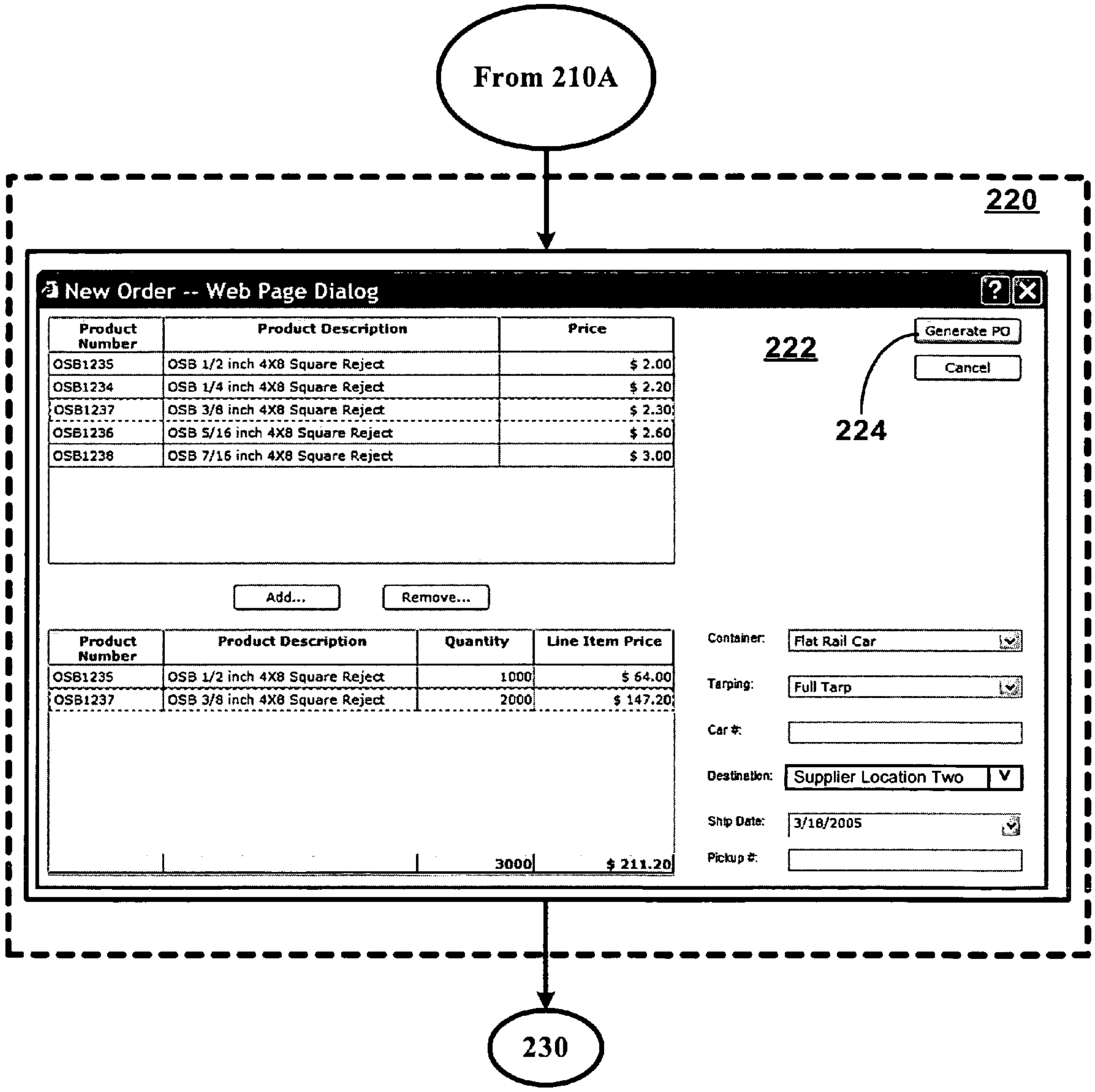
FIG. 35 shows a screenshot 222 for the PONow™ embodiment or mode.

FIG. 35 shows a screenshot 222 for the PONow™ embodiment or mode. As an example, screenshot 222 displays different kinds of products, their product number, and previously agreed price. (Or, in some embodiments, dynamic, but set according to previously agreed factors and/or formulae).

Note also a Generate PO button 224, which, when clicked by the supplier, in fact generates a PO, which is communicated to the buyer, and contractually binds the buyer to the same extent as any other PO, and otherwise puts into motion the entire transaction, including shipment and payment. Also, at this point, the system automatically prints an order confirmation.

Figure 36:
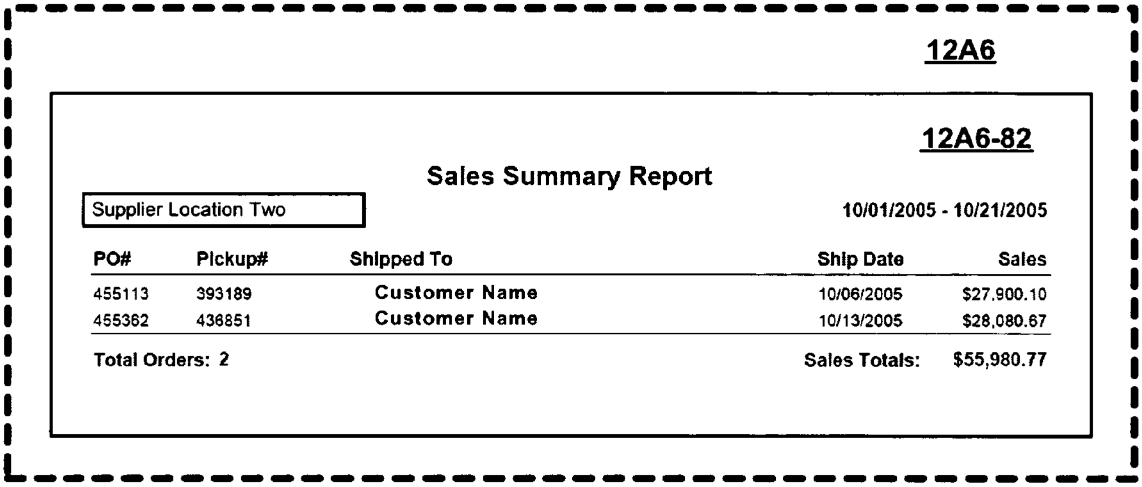
FIG. 36 presents a screenshot having tabular listings of dated transactions.
Figure 39:
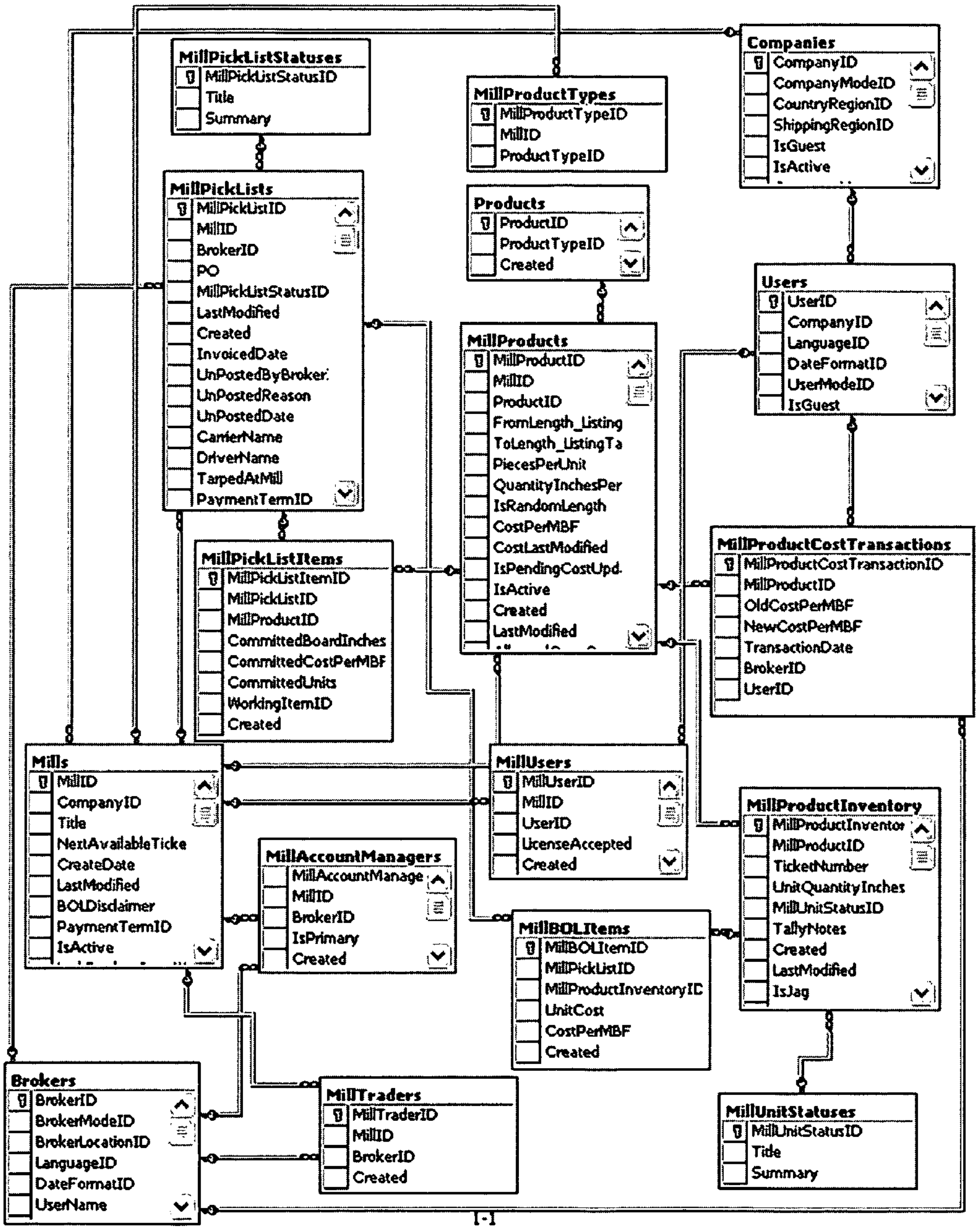
FIGS. 39-41 depict software system architecture for an alternate embodiment of a taxonomy engine as described herein.
Figure 40:
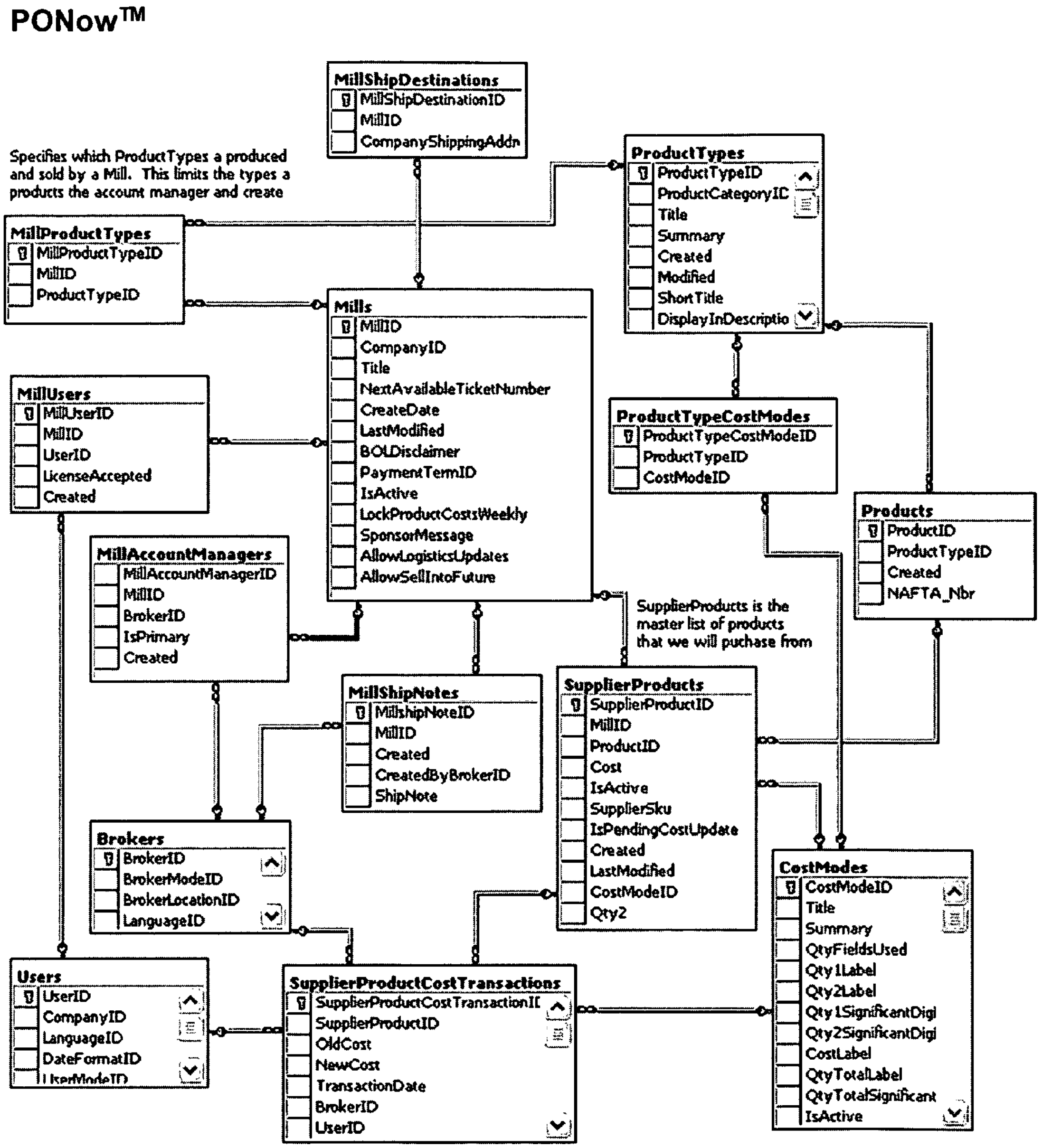
Figure 41:
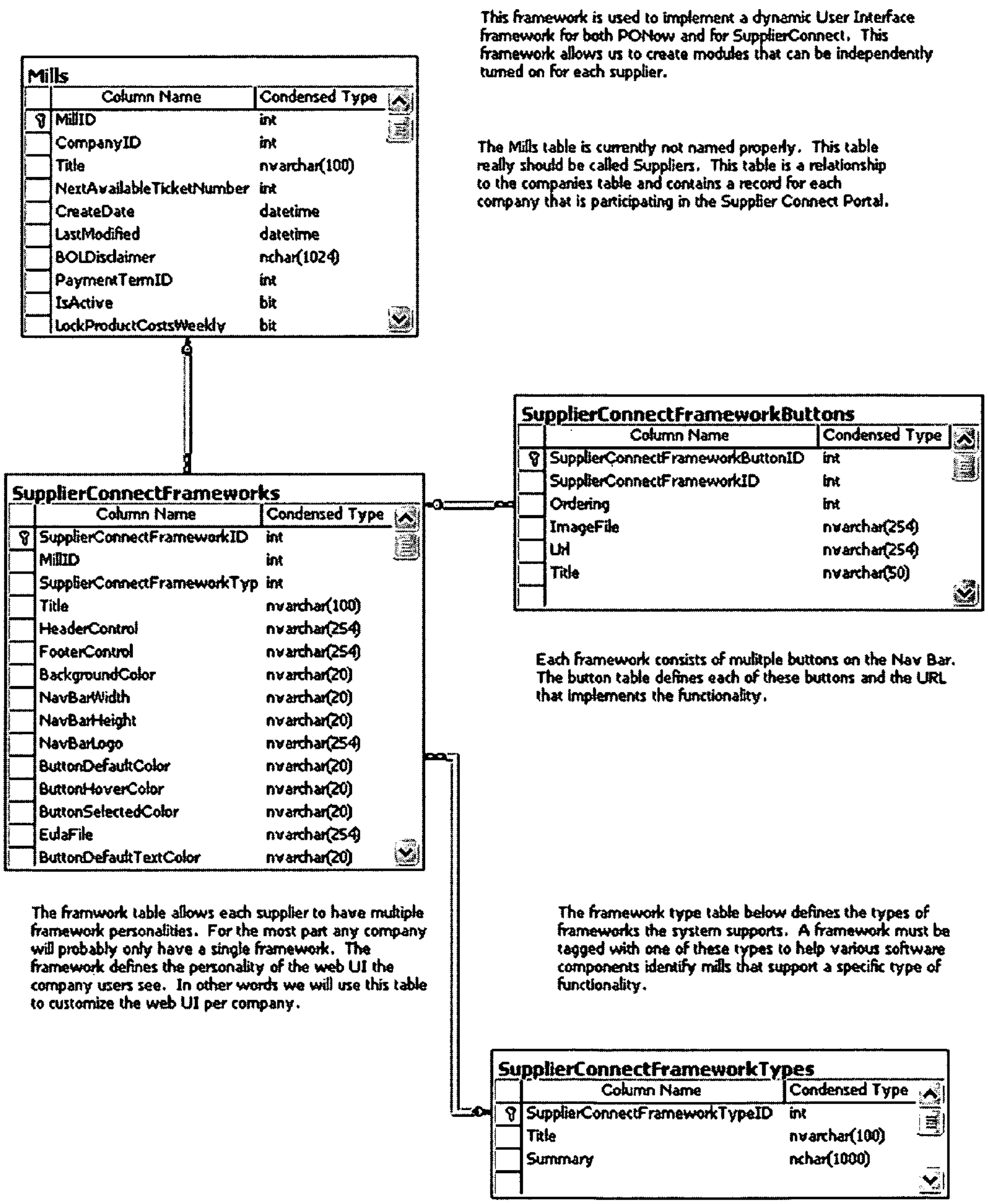

FIGS. 36-38 depict other features available in some embodiments of the PONow™ mode. For example, sales and product reports based on the inventory and transaction data in the system are provided as an option for the supplier or wholesaler to acquire other current or historic sale and product reports using the PONow™ algorithm technology as previously described. This data in turn can be used to develop future prices and other terms of future transactions. In other embodiments, data that has not yet been effectively aggregated can both be aggregated and analyzed in a manner not possible prior to the use of the system described.

In FIG. 36, screenshot 12A6-82, a tabular listing of transactions occurring between Oct. 1 and Oct. 21, 2005 is presented upon pressing the hot links Sales Summary Report similar to the hotlinks presented in screenshot 12A6-58 of FIG. 28. As shown in the tabular data of screenshot 12A6-82, a supplier initiated two purchase orders, Nos. 455113 and 455382, that provided close to $56,000 in sales.

In FIG. 37, screenshot 12A6-84 is presented upon pressing the hot links Sales Detail Report for the Oct. 1-21, 2005 transactions. As shown in the tabular data of screenshot 12A6-84, the itemization of purchase orders Nos. 455113 and 455382 show the range of product types associated with each purchase order. For example, PO. 455113 has a tabular listing of four types of OSB and how the distribution of approximately $28000 in sales is proportioned within these four OSB types. Similarly, PO. 455362 has a tabular listing of seven OSB types and how the approximately $28,000 is distributed. The data presented in this screen is preferably generated by a taxonomy engine of the type described elsewhere in this application.

In FIG. 38, screenshot 12A6-86 is presented upon pressing the hot links Product Report for the Oct. 1-21, 2005 transactions. As shown in the tabular data of screenshot 12A6-86, product code number and description show the amount of sales per square footage unit that was sold for 14—4×8 OSB. The data presented in this screen is preferably generated by a taxonomy engine of the type described elsewhere in this application.

Taxonomy Engine

In practice, the taxonomy engine referenced at various points above allows ProductTypes to be defined. CostModes may then be defined, and then one or more CostModes may be related to a ProductType. Additionally, this taxonomy allows Attributes to be defined, each Attribute having one or more defined AttributeValues. A ProductType can be associated with no Attribute or one or more Attributes. For each Attribute associated with a ProductType, a subset of the Attribute's AttributeValues can be assigned for use by that ProductType. To illustrate implementation of the taxonomy, the following examples in the context of wood-product commerce are offered:

EXAMPLE 1

ProductType="Softwood Dimension"

Exemplary CostModes related to "Softwood Dimension":

"BF, cost/MBF"—quantity by board feet, cost per M board feet;

"Piece, cost/Piece"—quantity by piece, cost per piece;

"Piece, cost/MBF"—quantity by piece, cost per thousand board feet;

"Unit, Pieces/Unit, Cost/Unit"—quantity by unit, quantity of pieces in unit, cost per unit;

"Unit, Pieces/Unit, Cost/MBF"—quantity by unit, quantity of pieces in unit, cost per thousand board feet.

Exemplary ProductTypeAttributes and assigned AttributeValues:

"Dimension"—2×4, 2×6, 2×8;

"Grade"—#1, #2, econ, util;

"Species"—Ponderosa Pine, Inland Hem Fir, Douglas Fir;

"Moisture"—Grn, AD, KD, KDHT;

"Dressing"—rough, s2s, s4s;

"Length"—6', 8', 10', 12'

Exemplary "Softwood Dimension" products created from the attributes above are as follows:

2×4 #1 Douglas Fir AD s2s 6'

2×4 #1 Douglas Fir AD s2s 8'

2×4 #1 Douglas Fir AD s2s 10'

2×4 #1 Douglas Fir AD s2s 12'

2×4 #2 Douglas Fir AD s2s 6'

2×4 #2 Douglas Fir AD s2s 8'

2×4 #2 Douglas Fir AD s2s 10'

2×4 #2 Douglas Fir AD s2s 12'

Each of the above product examples may then be bought and sold via any of the CostModes related to the "Softwood Dimension" ProductType. Additionally, given the data above, 1728 (dimension×grade×species×moisture×dressing×length) individual products may be created using the implemented taxonomy.

EXAMPLE 2

ProductType="Engineered Panels"

Exemplary CostModes:

"Piece, cost/MSFT"—quantity by piece, cost per M square feet;

"Unit, Piece/Unit, cost/MSFT"—quantity by unit, quantity pieces per unit, cost per M square feet.

Exemplary ProductTypeAttributes:

"PanelType"—OSB, Plywood, MDF

"Size"—3×8, 4×8, 4×10, 4×12

"Grade"—Dunnage, Mill Cert, Reject

"Thickness"—¼", ½", ¾"

"Edge"—Square, T&G Full, T&G Scant

This data may then be used to create the following exemplary products:

4×8 OSB Mill Cert ¼" Square

4×8 OSB Mill Cert ½" Square

4×8 OSB Mill Cert ¾" Square

4×8 OSB Mill Cert ¼" Square

4×8 OSB Mill Cert ½" Square

4×8 OSB Mill Cert ¾" Square

Any combination of the product attributes above may then be bought and/or sold. Additionally, given the data above, 432 (paneltype×size×grade×thickness×edge) individual products may be created using the implemented taxonomy.

The cost modes may be applied during order entry to specify how the wholesaler/broker is buying and selling the product. The implemented taxonomy enables simple invention/creation of new cost modes on the fly and relation of the cost modes to ProductTypes while minimizing the amount of required programming code.

CostModes provide a means for specifying "quantity" and a "cost per" to a line item on an order (the line item being a taxonomical product definition). Some example of costmodes are:

By piece, cost/piece

By pallet, pieces/pallet, cost/piece

By lot, cost/lot

By unit, pieces/unit, cost/MBF

Some cost modes require the use of the MetaAttributeValues from the taxonomy to calculate total cost. For example, "By unit, pieces/unit, cost/MBF" may require, for an order item's taxonomical product definition, determining the values specified for dimension and length, and then determining the meta attributes for these values to get the width, height, and length in inches to help calculate MBF (millions of board feet).

Once a CostMode is defined, the taxonomy may be used to specify the CostModes each ProductType can use via the ProductTypeCostModes table. When a user accesses the User Interface to define a product for a ProductType, they are presented with the list of costing modes that they can use to specify quantity and cost/per for the order item.

The embodiments of the invention in which an exclusive property or privilege is claimed are defined as follows:

1. A system to conduct a three party business transaction for a product owned by a supplier, the transaction between the supplier and a wholesaler and a buyer, the system comprising:

a first communication system accessible by the supplier and having devices configurable to transmit for the product a product type, a product attribute and a cost mode to the wholesaler;

a microprocessor executable first algorithm provided by the wholesaler to the supplier to configure the first communication system devices to categorize the product with the product type, the product attribute and the cost mode;

a microprocessor executable second algorithm provided by the wholesaler to the supplier to configure the first communication system devices to create documents that commit the wholesaler to purchase title to the product and transfer ownership of the product to the wholesaler, and to configure the first communication system devices later to create a purchase order for the product at a time chosen by the supplier or the wholesaler;

a second communication system having microprocessor configurable devices to transmit information from the wholesaler regarding a specification and a price of the product to the buyer; and a microprocessor executable third algorithm provided by the wholesaler to the buyer to configure the second communication system devices to create documents that commit the buyer to purchase title to the product and transfer ownership of the product to the buyer.

2. The system of claim 1, wherein the first algorithm to categorize includes hierarchical classifications.

3. The system of claim 2, wherein the hierarchical classifications include product classes that are defined by physical attribute and quantity.

4. The system of claim 3, wherein the product is a durable good.

5. The system of claim 4, wherein the durable good includes building supplies.

6. The system of claim 4, wherein building supplies is one or more sales items selected from the group comprising: lumber, plumbing, heating, electrical, masonry, roofing, landscaping goods, OSB, plywood, panel products, siding, windows, doors and hardware.

7. The system of claim 6, wherein the ownership and physical transfer of the building supplies are conveyed to the buyer from the supplier by arrangements made by the wholesaler.

8. The system of claim 7, wherein the arrangements of ownership and physical transfer to the buyer from the supplier is initiated by a purchase order submitted by the third party to the wholesaler.

9. The system of claim 6, wherein the purchase order is initiated by communication via the Internet between the buyer and the wholesaler.

10. The system of claim 1, wherein the first communication system includes signal communication with a network.

11. The system of claim 10, wherein the network includes access to the Internet.

12. The system of claim 1, wherein the second communication system includes signal communication with a network.

13. The system of claim 12, wherein the network includes access to the Internet.

14. The system of claim 1, wherein the second algorithm includes instructions to classify the product by specification and quantity as defined by the wholesaler.

15. The system of claim 1, wherein the second algorithm includes instructions to classify the at least one product by specification and quantity as defined by the supplier.

16. The system of claim 1, wherein the ownership is secured by the wholesaler of the product and physical possession is retained by the supplier.

17. The system of claim 16, wherein the ownership by the buyer of the product is arranged by the wholesaler and physical possession is retained by the supplier.

18. The system of claim 17, wherein the wholesaler arranges ownership by the buyer of the product by communication of a purchase order initiated by the buyer to the wholesaler.

19. The system of claim 18, wherein the purchase order is initiated by communication via the Internet.

20. The system of claim 17, wherein physical transfer of the product is conveyed to the buyer by the supplier through arrangements made by the wholesaler.

21. The system of claim 20, wherein the wholesaler arranges physical transfer of the product to the buyer by communication of a purchase order initiated by the buyer to the wholesaler.

22. The system of claim 16, wherein the ownership and physical transfer of the product is conveyed to the buyer from the supplier by arrangements made by the wholesaler.

23. The system of claim 22, wherein the wholesaler arranges ownership and physical transfer of the product to the buyer by communication of a purchase order initiated by the third party to the wholesaler.

24. The system of claim 23, wherein the purchase order is initiated by communication via the Internet.

* * * * *